US007560088B2

(12) United States Patent
Keller et al.

(10) Patent No.: US 7,560,088 B2
(45) Date of Patent: *Jul. 14, 2009

(54) COMPACT SULFUR RECOVERY PLANT AND PROCESS

(75) Inventors: Alfred E. Keller, Ponca City, OK (US); Sriram Ramani, Katy, TX (US); Nathan A. Hatcher, Ponca City, OK (US); Joe D. Allison, Ponca City, OK (US); Steven E. Lusk, Ponca City, OK (US); Larry D. Swinney, Stillwater, OK (US); Kerri J. Kirkendall, Ponca City, OK (US); Gilbert E. Torres, Ponca City, OK (US); Paul D. Stewart, Ponca City, OK (US); Terry D. Pruitt, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/809,985

(22) Filed: Jun. 4, 2007

(65) Prior Publication Data
US 2007/0297970 A1    Dec. 27, 2007

Related U.S. Application Data

(63) Continuation-in-part of application No. 11/367,077, filed on Mar. 3, 2006, now Pat. No. 7,226,572.

(51) Int. Cl.
*B01D 53/74*   (2006.01)
*B01D 53/75*   (2006.01)
*B01D 53/86*   (2006.01)
*C01B 17/04*   (2006.01)

(52) U.S. Cl. .............. 423/573.1; 423/574.1; 423/576.2; 423/576.8; 423/DIG. 6; 422/168; 422/169; 422/170; 422/171; 422/177

(58) Field of Classification Search .............. 423/573.1, 423/574.1, 576.2, 576.8, DIG. 6; 422/168, 422/169, 170, 171, 177
See application file for complete search history.

(56) References Cited

U.S. PATENT DOCUMENTS 1,930,716 A    10/1933   Jaegar (Continued)

FOREIGN PATENT DOCUMENTS

RU    2023655    11/1994

(Continued)

OTHER PUBLICATIONS

Arthur L. Kohl et al. "Gas Purification" 5th Ed. (1997) Gulf Publishing Co., Houston, Texas USA, ISBN-0-88415-220-0, pp. 675-676.*

(Continued)

*Primary Examiner*—Timothy C Vanoy
(74) *Attorney, Agent, or Firm*—ConocoPhillips Company

(57) ABSTRACT

A compact sulfur recovery system is disclosed which includes an upflow orientation for the gases through a primary structure including a catalytic partial oxidation reaction zone, a first temperature-control zone, a first Claus catalytic reaction zone, a second temperature-control zone, a first liquid sulfur outlet, and a first effluent gas outlet. The upward flow of the gases puts the hottest gases in contact with the tubes and tube sheet in the waste heat boiler where there is greater confidence in having liquid water in most continuous therewith.

29 Claims, 7 Drawing Sheets

U.S. PATENT DOCUMENTS

| | | |
|---|---|---|
| 2,963,348 A | 12/1960 | Sellers |
| 3,752,877 A | 8/1973 | Beavon |
| 4,038,036 A | 7/1977 | Beavon |
| 4,146,580 A | 3/1979 | Beavon |
| 4,197,277 A | 4/1980 | Sugier et al. |
| 4,219,445 A | 8/1980 | Finch |
| 4,233,276 A | 11/1980 | D'Souza et al. |
| 4,271,041 A | 6/1981 | Boudart |
| 4,279,882 A | 7/1981 | Beavon |
| 4,302,434 A | 11/1981 | Hellmer et al. |
| 4,311,683 A | 1/1982 | Hass et al. |
| 4,325,842 A | 4/1982 | Slaugh |
| 4,325,843 A | 4/1982 | Slaugh |
| 4,326,992 A | 4/1982 | Slaugh |
| 4,331,544 A | 5/1982 | Takaya |
| 4,406,873 A | 9/1983 | Beavon |
| 4,481,181 A | 11/1984 | Norman |
| 4,596,699 A | 6/1986 | Desgrandchamps |
| 4,632,043 A | 12/1986 | Pendergraft |
| 4,684,514 A | 8/1987 | Chen |
| 4,722,799 A | 2/1988 | Ashbrook et al. |
| 4,797,268 A | 1/1989 | McGovern et al. |
| 4,814,159 A | 3/1989 | Voirin |
| 4,844,837 A | 7/1989 | Heck et al. |
| 4,863,707 A | 9/1989 | McShea, III et al. |
| 4,877,550 A | 10/1989 | Goetsch et al. |
| 4,886,649 A | 12/1989 | Ismagilov et al. |
| 4,889,701 A | 12/1989 | Jones et al. |
| 4,891,187 A | 1/1990 | Jungfer et al. |
| 4,988,494 A | 1/1991 | Lagas et al. |
| 5,039,503 A | 8/1991 | Sauvion et al. |
| 5,185,140 A | 2/1993 | Kvasnikoff et al. |
| 5,232,467 A | 8/1993 | Child et al. |
| 5,338,716 A | 8/1994 | Triplett |
| 5,384,301 A | 1/1995 | Flytzani-Stephanopoulos et al. |
| 5,397,556 A | 3/1995 | Towler et al. |
| 5,451,557 A | 9/1995 | Sherif |
| 5,458,808 A | 10/1995 | Suggitt et al. |
| 5,472,920 A | 12/1995 | Dubois et al. |
| 5,508,013 A | 4/1996 | Kvasnikoff et al. |
| 5,512,260 A | 4/1996 | Kiliany et al. |
| 5,573,991 A | 11/1996 | Sherif |
| 5,597,546 A | 1/1997 | Li et al. |
| 5,603,913 A | 2/1997 | Alkhazov |
| 5,628,977 A | 5/1997 | Heisel et al. |
| 5,639,929 A | 6/1997 | Bharadwaj et al. |
| 5,648,582 A | 7/1997 | Schmidt |
| 5,653,953 A | 8/1997 | Li et al. |
| 5,654,491 A | 8/1997 | Goetsch |
| 5,676,921 A | 10/1997 | Heisel et al. |
| 5,700,440 A | 12/1997 | Li |
| 5,720,901 A | 2/1998 | De Jong et al. |
| 5,807,410 A | 9/1998 | Borsboom |
| 5,814,293 A | 9/1998 | Terorde et al. |
| 5,891,415 A | 4/1999 | Alkhazov et al. |
| 5,897,850 A | 4/1999 | Borsboom |
| 5,965,100 A | 10/1999 | Khanmamedov |
| 5,985,178 A | 11/1999 | Long et al. |
| 6,017,507 A | 1/2000 | Nougayrede et al. |
| 6,083,471 A | 7/2000 | Philippe et al. |
| 6,099,819 A | 8/2000 | Srinivas et al. |
| 6,103,206 A | 8/2000 | Taylor, Jr. et al. |
| 6,103,773 A | 8/2000 | Wittenbrink et al. |
| 6,221,280 B1 | 4/2001 | Anumakonda et al. |
| 6,235,259 B1 | 5/2001 | Ledoux et al. |
| 6,372,193 B1 | 4/2002 | Ledoux et al. |
| 6,402,989 B1 | 6/2002 | Gaffney |
| 6,403,051 B1 | 6/2002 | Keller |
| 6,409,940 B1 | 6/2002 | Gaffney et al. |
| 6,447,745 B1 | 9/2002 | Feeley et al. |
| 6,488,838 B1 | 12/2002 | Tonkovich et al. |
| 6,497,812 B1 | 12/2002 | Schinski |
| 6,540,975 B2 | 4/2003 | Tonkovich et al. |
| 6,579,510 B2 | 6/2003 | Keller et al. |
| 6,602,478 B2 | 8/2003 | Brundage |
| 6,616,909 B1 | 9/2003 | Tonkovich et al. |
| 6,726,850 B1 | 4/2004 | Reyes et al. |
| 6,776,974 B1 | 8/2004 | Burnmaster et al. |
| 6,780,392 B2 | 8/2004 | Gross et al. |
| 6,800,269 B2 | 10/2004 | Keller |
| 6,946,111 B2 | 9/2005 | Keller et al. |
| 7,226,572 B1 * | 6/2007 | Keller et al. ............. 423/573.1 |
| 2001/0008619 A1 | 7/2001 | Geus et al. |
| 2002/0098145 A1 | 7/2002 | Borsboom et al. |
| 2002/0119091 A1 | 8/2002 | Keller |
| 2003/0129123 A1 | 7/2003 | Ramani et al. |
| 2003/0194366 A1 | 10/2003 | Srinivas et al. |
| 2005/0158235 A1 | 7/2005 | Ramani et al. |
| 2005/0180914 A1 | 8/2005 | Keller et al. |
| 2005/0201924 A1 | 9/2005 | Ramani et al. |
| 2006/0051275 A1 | 3/2006 | Ramani et al. |

FOREIGN PATENT DOCUMENTS

| | | |
|---|---|---|
| WO | WO9421358 | 9/1994 |
| WO | WO9719019 | 5/1997 |

OTHER PUBLICATIONS

Chao, J.; "Properties of Elemental Sulfur," Hydrocarbon Proceesing, 217-223 (1980).

Chun, S. W., et al.; "Selective Oxidation of H2S to Elemental Sulfur over TiO2/SiO2 Catalysts,"; Applied Catalysis B: Environmental 16, 235-243 (1998).

Clark, P.D.; "Production of H2 from Catalytic Partial Oxidation of H2S in a Short-Contact-Time Reactor"; Catalysis Communications 5:743-747 (2004).

Gamson, B.W., et al.; "Sulfur from Hydrogen Sulfide"; Chem. Eng. Prog. vol. 49, No. 4, 203-516 (Apr. 1953).

Goar, B.G.; "Today's Sulfur Recovery Processes"; Hydrocarbon Processing; vol. 47, No. 9, 248-252 (1968).

Goar, R.G.; "First Recycle Selectox Unit on Stream"; Oil & Gas Journal, 124-125 (1982).

Hass, R. H., et al.; "Process Meets Sulfur Recovery Needs"; Hydrocarbon Processing; 104-107 (1981).

Hickman, D.A.; "Production of Syngas by Direct Catalytic Oxidation of Methane"; Science 259:343-346 (Jan. 15, 1993).

Hyne, J.B.; "Methods for Desulfurization of Effluent Gas Streams"; Oil & Gas Journal, 64-78 (Aug. 28, 1972).

Ismagilov, Z.R., et al.; "New Catalysts and Processes for Environmental Protection"; React. Kinet. Catal. Lett., vol. 55, No. 2, 489-499 (1995).

Kerr, R.K., et al.; "A New Sulfur-Recovery Process: The RSRP"; Oil & Gas Journal, 230-243 (1982).

Kimtantas, C.L.; "Modified Claus Sulfur Recovery Unit Equipment"; Fundamentals of Sulfur Recovery, Presented at the 53rd Annual Lawrence Reid Gas Conditioning Conference, Feb. 23-26, 2003; pp. 73, 80-81; Univ. Oklahoma, Norman, Oklahoma.

Knight, W.P.; "Improve Sulfur Condensers"; Hydrocarbon Processing (May 1978); Gulf Publishing Co., Houston, Texas vol. 57, No. 5, pp. 239-241.

Knight, W.P.; "Evaluate Waste Heat Steam Generators"; Hydrocarbon Processing (Jul. 1978); Gulf Publishing Co., Houston, Texas; pp. 126-130.

Kohl, A.L., et al.; "Gas Purification, Fourth Edition"; Gulf Publishing Company, Library of Congress Cataloging in Publication Data; TP7545K6, 1985, 665.7, 85-4148; ISBN0-87201-314.6; 457-460.

Lagas, J.A., et al.; "Selective-Oxidation Catalyst Improves Claus Process"; Oil & Gas Journal; 68-71 (1998).

Li, K.T., et al.; "Catalytic Oxidation of Hydrogen Sulfide to Sulfure on Vanadium Antimonate"; Ind. Eng. Chem. Res., 1480-1484 (1997).

M.E.D. Raymont; "Role of Hydrogen in Claus Plants"; Hydrocarbon Processing; 177-179 (1975).

Taylor, H.A., et al.; "The Decomposition of Hydrogen Sulphide"; Journal of Physical Chemistry, vol. 31, 1212-1219 (1927).

Watson, R.W., et al.; "The Successful Use of Oxygen in Claus Plants"; HTI Quarterly: Winter 1995/1996, 95-101.

Search Report & Written Opinion on International PCT/US07/63085 dated Oct. 5, 2007 (7 pg.).

* cited by examiner

COMPACT SULFUR RECOVERY PLANT AND PROCESS

CROSS-REFERENCE TO RELATED APPLICATIONS

The present patent application is a continuation-in-part of a U.S. patent application Ser. No. 11/367,077, now U.S. Pat. No. 7,226,572 issued Jun. 5, 2007, filed Mar. 3, 2006, entitled "Compact Sulfur Recovery Plan and Process," and which is hereby incorporated by reference in its entirety for all purposes.

STATEMENT REGARDING FEDERALLY SPONSORED RESEARCH OR DEVELOPMENT

N/A

BACKGROUND OF THE INVENTION

1. Technical Field of the Invention

The present invention generally relates to Claus sulfur recovery plants and to processes for recovering sulfur from $H_2S$-containing gas streams. More particularly, the invention relates to Claus processes and apparatus in which the combustion stage is replaced by a catalytic partial oxidation stage. The invention relates still more particularly to compact systems that require less plot space than conventional modified Claus plants operating at the same sulfur production capacity.

2. Description of the Related Art

Sulfur-recovery plants, also called Claus plants, are well known for removing hydrogen sulfide gas ($H_2S$) resulting from petroleum refining processes and other industrial processes by converting the $H_2S$ to elemental sulfur. A conventional modified Claus process includes two primary stages: a thermal or combustion stage and a catalytic stage. In the thermal stage, which is carried out in a furnace, the $H_2S$ gas is contacted with a stoichiometric amount of air or a mixture of oxygen and air in a flame so that about one third (⅓) of the $H_2S$ is combusted according to the chemical equation:

$$H_2S + 3/2 O_2 \rightarrow SO_2 + H_2O \tag{1}$$

Equation 1 is highly exothermic and not limited by equilibrium. Still in the reaction furnace, a portion of the uncombusted $H_2S$ (i.e., about ⅔ of the initial amount in the feed) reacts with some of the sulfur dioxide ($SO_2$) product to form elemental sulfur ($S^0$) and water vapor according to the chemical equation:

$$2H_2S + SO_2 \leftrightarrow 3/x S^0_x + 2H_2O \tag{2}$$

(x=2, 6, or 8 depending on the temperature and pressure). Chemical Equation 2, which is sometimes referred to as the "Claus reaction," is endothermic, and the extent of conversion of the $H_2S$ and $SO_2$ to elemental sulfur is limited by the chemical equilibrium of the reaction. In the thermal stage a total of about 55 to 70% of the $H_2S$ in the original feed is converted to elemental sulfur. To improve the yield, the reacted gases are cooled in a fire tube boiler after emerging from the reaction furnace and elemental sulfur is condensed from the gas stream and removed in molten form, whereupon the gases enter a catalytic stage, which is carried out in a series of catalytic reactors.

In the catalytic stage, the gases are reheated and then passed over a high surface area catalyst bed that promotes the Claus reaction and further converts the process stream to elemental sulfur according to the Claus reaction. Typical Claus catalysts are alumina and titania. Because of the reversible chemical equilibrium of the Claus reaction (Equation 2), the formed products can react according to the reverse Claus reaction (Equation 3)

$$3/x S^0_x + 2H_2O \leftrightarrow 2H_2S + SO_2 \tag{3}$$

with the effect of reducing the efficiency of the Claus plant. The reverse Claus reaction becomes more pronounced as reactor temperature increases. By removing formed elemental sulfur from the process gas exiting the thermal stage, the forward Claus reaction is made more favorable, in accordance with Le Chatlier's Principle. In the catalytic stage, the remaining $H_2S$ is reacted with the $SO_2$ (at lower temperatures, i.e., about 200-350° C.) over a catalyst to make more sulfur. Additional catalytic reactors are necessary to remove sequential increments of sulfur. Factors like concentration, flow rate and reaction temperature influence the reaction. From one to four sequential stages of reheating, catalytic reacting and condensing are usually employed industrially. In a typical modified Claus plant in which two or three catalytic reactors are employed, about 90 to 98% of the $H_2S$ originally fed to the plant is recovered as elemental sulfur. When endeavoring to go beyond the 90-98% level of sulfur removal, Claus reactors become ineffective; therefore, other measures to remove sulfur from the effluent must be taken.

A conventional modified Claus process is typically employed for processing large quantities of gases containing a high concentration (i.e., >40 vol. %) $H_2S$ in Claus plants, producing more than 7,000 tons of sulfur per year. The modified Claus plants in use today are normally operated at less than 2 atmospheres pressure. Because of this low pressure, the pipes and vessels have very large diameters for the flow compared to most refinery or gas plant processes. The low pressure operation forces the equipment to be designed for low pressure drop to have adequate capacity. Further complicating the matter, as ever stricter requirements of regulatory agencies mandate greater efficiency from sulfur recovery plants, it is now common for Claus plants to include tail gas treatment unit. A drawback of adding such equipment to improve sulfur recovery is the further decrease in plant capacity due to increased resistance to flow from additional friction. In order to reduce the frictional pressure loss, the flow of gas through the unit is usually slowed further by modifying the plant design so that the cross-sectional area of the equipment is even larger than before, and the Claus catalyst beds are made shorter, and plant capacity is diminished. Another disadvantage is that the larger sized equipment is more expensive to build and causes the sulfur plant to take up even more plot space. In order to be in compliance with applicable environmental regulations today, a typical modified Claus plant and the necessary tail gas treatment units, constitute a great deal of equipment and occupy a large space. Consequently, there is a need in the art for high capacity sulfur recovery plants and processes that can meet or exceed current sulfur emission standards, and yet are simple in design and more compact than conventional sulfur recovery plants and processes. A way to avoid some of the high capital costs and operating costs of Claus operations in use today would be welcomed by the industry.

SUMMARY OF THE INVENTION

The system and process of the present invention potentially resolve many of the drawbacks of existing modified Claus sulfur recovery plants by offering smaller, less complicated, more efficient equipment that is less costly to build than conventional sulfur recovery plants, and make possible the expansion of sulfur recovery process capacity. Advantageously, the new system and process are intended to provide for better control or regulation of catalyst and reactant gas temperatures so that more efficient and selective performance of the Claus catalysts is made possible. Some of the drawbacks of conventional sulfur recovery processes are also avoided by employing a new sulfur recovery process that has the operational advantage of using a partial oxidation short contact time reactor instead of a free flame combustion chamber. In the partial oxidation short contact time reactor oxygen is reacted with $H_2S$ in the feed gases primarily via direct partial oxidation of the $H_2S$, according to the chemical reaction

$$H_2S + \frac{1}{2}O_2 \rightarrow 1/xS_x + H_2O \quad (4)$$

(x=2, 6 or 8, depending on the temperature and pressure).

A sulfur recovery plant or system in accordance with certain embodiments of the present invention combines all the individual functions of existing Claus sulfur recovery plants in a significantly more compact, staged arrangement. In some embodiments, the new sulfur recovery plant comprises a single operational unit combining all of the functions of a short-contact time partial oxidation reactor-modified Claus sulfur recovery plant.

In accordance with certain embodiments of the present invention a compact sulfur recovery system is provided comprising a plurality of components in serial fluid flow arrangement. This arrangement includes a catalytic partial oxidation reaction zone capable of withstanding temperatures up to about 2,700° F. (1,482° C.), a first temperature-control zone, a first Claus catalytic reaction zone comprising a catalyst temperature-regulation device, a second temperature-control zone, a first vapor-liquid sulfur separation zone, a first liquid sulfur outlet, and a first effluent gas outlet. In some embodiments a mixing zone precedes the catalytic partial oxidation reaction zone, and in some embodiments the system includes one or more temperature measuring devices. In some embodiments, the first temperature-control zone contains a heat transfer enhancement medium. The system is preferably configured so as to deter the accumulation of liquid sulfur in the first Claus catalytic reaction zone, when the system is in operation in a downward flow process for recovering elemental sulfur from a $H_2S$-containing gas stream. For instance, in some embodiments the catalytic partial oxidation reaction zone, first temperature-control zone, first Claus catalytic reaction zone, second temperature-control zone, first vapor-liquid sulfur separation zone, and first liquid sulfur outlet are in a vertically oriented stacked arrangement. The vertically stacked arrangement discourages, deters or prevents accumulation of liquid sulfur on the catalyst, allowing condensed sulfur to drain down and away from the Claus catalyst when the system is in use.

In some embodiments, a compact sulfur recovery system in accordance with the present invention comprises a primary structure that contains the catalytic partial oxidation reaction zone, first temperature-control zone, first Claus catalytic reaction zone, second temperature-control zone, first vapor-liquid sulfur separation zone, first liquid sulfur outlet and first effluent gas outlet. In certain embodiments, the primary structure also contains a second Claus catalyst reaction zone and a third temperature control zone in serial flow arrangement between the first vapor-liquid sulfur separation zone and the first effluent gas outlet.

In certain embodiments, the vapor-liquid separation zone is configured for operating in co-current downward flow mode, to deter re-entrainment of liquid sulfur in a gas stream exiting the separation zone. In certain embodiments, the vapor-liquid separation zone is configured for promoting liquid drainage along a separate path than that of gas flowing to the gas outlet, and in certain embodiments, the vapor-liquid separation zone is configured to deter liquid sulfur accumulation in the separation zone.

In some embodiments, an above-described system further comprises a secondary structure in fluid flow communication with the first effluent gas outlet of the primary structure. In certain embodiments the secondary structure comprises the second Claus catalytic reaction zone, which may include a catalyst temperature-regulation device, a third temperature-control zone, a second vapor-liquid sulfur separation zone, a second liquid sulfur outlet, and a second effluent gas outlet. In some embodiments there is a preheater disposed between the primary and secondary structures and adapted for heating gases after leaving the first vapor-liquid separation zone and prior to entering the second Claus catalytic reaction zone.

In certain embodiments, at least one of the foregoing components is oriented such that accumulation of liquid sulfur in either or both the first and second Claus catalytic reaction zone(s) is deterred when the system is operated to recover elemental sulfur from a $H_2S$-containing gas stream. For example, the above-mentioned primary and secondary structures, or portions thereof, may be oriented such that the force of gravity on liquid sulfur in the first and/or second Claus catalytic reaction zone(s) causes any liquid sulfur that is present to move away from the Claus reaction zones, when the system is in operation for recovering elemental sulfur from a $H_2S$-containing gas stream.

In some embodiments of a compact system comprising primary and secondary structures, as described above, there is a first channel interconnecting the primary and secondary structures, the first channel being oriented at an upward angle greater than about 5 degrees and less than about 90 degrees, with respect to a plane that is horizontal to the vertical plane of the primary structure. In some embodiments this first channel comprises an auxiliary temperature-control zone containing a heat transfer enhancement medium or material to cool and condense elemental sulfur from the vapor phase and allow the liquid sulfur to drain. In some embodiments the primary and/or secondary structure comprises a bed of heat transfer enhancement medium preceding the Claus catalytic reaction zone. The heat transfer enhancement medium is preferably physically and chemically resistant or inert to corrosive carbon or sulfur-containing compounds and other chemical components of the effluent from CPOX reaction zone, and does not take part in the chemical reactions involving sulfur species when the system is in operation. The heat transfer enhancement medium is preferably also resistant to the high temperatures that it will experience during operation of the system. A preferred HTEM is quartz particulates, although another suitable ceramic materials and other natural or engineered shapes or forms (e.g., spheres, cylinders) could be used instead, provided that the medium has a contact surface that is capable of improving the rapid transfer of heat from the rapidly flowing gases that exit the CPOX reaction zone during operation of the sulfur recovery system. Preferably the geometry of the HTEM is such that the packed vessel offers little resistance to flow, or causes only a slight increase in pressure drop versus an empty tube during operation of the system. Suitable compositions and geometries of the HTEM are described in the section subtitled "Heat Transfer Enhancement Medium." The HTEM is preferably hydraulically smooth, as defined by the roughness parameter being less than 0.1 (Reference: UNIT OPERATIONS OF CHEMICAL ENGINEERING, Fourth Edition, 1988, McGraw Hill, page 86-88). The same HTEM may be used in any of the heat exchange vessels described herein to facilitate heat transfer.

In certain embodiments, the above-mentioned third temperature-control zone is oriented at a downward angle greater than about 5 degrees and less than about 90 degrees with the horizontal plane relative to the plane of the secondary structure. This orientation is again advantageous for draining any condensed sulfur away from the Claus catalyst.

In certain embodiments, a system according to the present invention comprises: (a) means for carrying out the partial oxidation of $H_2S$ to produce a first process gas stream comprising primarily gaseous elemental sulfur, unconverted $H_2S$ and $SO_2$; (b) means for adjusting the temperature of the first process gas stream to a temperature or temperature range that favors the conversion of $H_2S$ and $SO_2$ according to the Claus reaction; (c) means for carrying out the Claus reaction of $H_2S$ and $SO_2$ in the first process gas stream to produce a second process gas stream, the means comprising a first Claus catalyst at a temperature or temperature range favoring the Claus reaction; (d) means for deterring accumulation of liquid elemental sulfur on the first Claus catalyst bed; (e) means for adjusting the temperature of the second process gas stream to a temperature or temperature range that favors the condensation of elemental sulfur from the second process gas stream but deters or prevents condensation in a second Claus catalyst bed; (f) means for separating elemental sulfur from the second process gas stream to make a third process gas stream; (g) means for carrying out the Claus reaction of $H_2S$ and $SO_2$ in the third process gas stream to produce a fourth process gas stream, the means comprising the second Claus catalyst bed; (h) means for deterring accumulation of condensed elemental sulfur on the second Claus catalyst bed; and (i) means for separating liquid elemental sulfur from the fourth process gas stream.

In certain embodiments, the aforesaid system further comprising, after step (f) and before step (g): ($f_1$) means for reheating the third process gas stream to provide a reheated third process gas stream; ($f_2$) means for adjusting the temperature of the reheated third process gas stream to a temperature or temperature range that favors the conversion of $H_2S$ and $SO_2$ according to the Claus reaction, to provide a temperature-adjusted third process gas stream; wherein, in step (g), the third process gas stream is the temperature-adjusted third process gas stream from step ($f_2$).

Also provided in accordance with certain embodiments of the present invention is a process for recovering elemental sulfur from a $H_2S$-containing gas stream, the process including: (a) obtaining an above-described compact sulfur recovery system wherein at least one component of the system is configured to deter accumulation of liquid sulfur in the first Claus catalytic reaction zone; (b) introducing a feed gas stream comprising $H_2S$ and $SO_2$ into the catalytic partial oxidation reaction zone such that a first process gas stream comprising elemental sulfur, unreacted $H_2S$, $SO_2$ and water is produced; (c) in the first temperature-control zone, adjusting the temperature of the first process gas stream to a first predetermined temperature or temperature range that is no more than 650° F. (343° C.) and above the dewpoint of elemental sulfur prior to entry of the first process gas stream into the first Claus catalytic reaction zone; (d) deterring accumulation of liquid elemental sulfur on the first Claus catalyst; (e) adjusting the temperature of the second process gas stream to a temperature or temperature range between 300 and 450° F. (149-232° C.) that favors the condensation of elemental sulfur; (f) carrying out the separation of elemental sulfur from the vapor mixture in a vapor-liquid separation zone to produce a third process gas stream; (g) adjusting the temperature of the third process gas stream to a temperature or temperature range between 400 and 600° F. (204-315° C.) that favors the conversion of $H_2S$ and $SO_2$ according to the Claus reaction; (h) carrying out the Claus reaction of $SO_2$ and residual $H_2S$ in the third process gas stream over a second Claus catalyst to produce a fourth process gas stream comprising gaseous elemental sulfur and residual gas, wherein the Claus reaction is carried out at a catalyst temperature or temperature range between 400 and 600° F. (204-315° C.) that favors the conversion of $H_2S$ and $SO_2$ according to the Claus reaction; (i) deterring accumulation of liquid elemental sulfur on the second Claus catalyst; (j) adjusting the temperature of the fourth process gas to a temperature or temperature range between 250 and 350° F. (121-177° C.) that favors condensation of elemental sulfur from the fourth process gas stream; (k) recovering condensed elemental sulfur; and (l) optionally, subjecting the residual gas to tail gas treatment.

For the purposes of this disclosure, the term "favors the Claus Reaction," means establishing the reaction conditions that causes the thermodynamic equilibrium Claus reaction to move toward the formation of elemental sulfur and water vapor from $H_2S$ and $SO_2$. This includes adjusting the $H_2S$:$SO_2$ molar ratio to 2:1 and allowing sufficient residence time for these gases in the Claus catalyst bed to reach reaction equilibrium. When the term is used with respect to a catalyst, it also means that the catalyst promotes Equation 2, and/or deters or does not promote the reverse Claus reaction (Equation 3) or other competing reactions.

In certain embodiments of the process, the predetermined temperatures or temperature ranges ($T_1$ and $T_2$) (FIG. 1) also favor the condensation of gaseous elemental sulfur. In certain embodiments the temperature ($T_1$) of the first process gas stream is maintained at a level above the dew point of elemental sulfur, typically between 450° F. and 600° F. (about 232-315° C.), to prevent the condensation of liquid sulfur on the Claus catalyst surface. In certain embodiments the temperature of the third process gas stream ($T_2$) is maintained in the range of 385° F. to 480° F. (about 196-249° C.) to prevent the condensation of liquid sulfur on the catalyst surface as the Claus reaction forms elemental sulfur. In certain embodiments, the temperature of the fourth process gas stream ($T_3$) (FIG. 1) is maintained between 255° F. and 310° F. (about 124-154° C.) to produce a liquid sulfur product with a low sulfur vapor pressure, prevent the solidification of any elemental sulfur, and keep the viscosity low. In some embodiments the above-described process includes maintaining a gas hourly space velocity of the feed gas stream in the catalytic partial oxidation reaction zone of at least 20,000 $h^{-1}$. In some embodiments the process includes maintaining a gas hourly space velocity of the first process gas stream in the first Claus reaction zone of at least 10,000 $h^{-1}$. In some embodiments the process includes maintaining a gas hourly space velocity of the second process gas stream in the second Claus reaction zone of at least 5,000 $h^{-1}$.

Certain embodiments of the present invention provide a process for recovering elemental sulfur from a $H_2S$-containing gas stream, wherein the process comprises (a) employing an above-described system wherein at least one of the components is configured to deter accumulation of liquid sulfur in the first Claus catalytic reaction zone; (b) introducing a feed gas stream comprising $H_2S$ and $O_2$ into the catalytic partial oxidation reaction zone, for form a first process gas stream comprising elemental sulfur, unreacted $H_2S$, $SO_2$ and water. In some embodiments, a gas hourly space velocity of the feed gas stream is maintained in the catalytic partial oxidation reaction zone of at least 20,000 $h^{-1}$. The process also includes: (c) in the first temperature-control zone, adjusting the temperature of the first process gas stream to a first predetermined temperature or temperature range that is no more than 650° F. (343° C.) and above the dewpoint of elemental sulfur prior to entry of the first process gas stream into the first Claus catalytic reaction zone; (d) in the first Claus catalytic reaction zone, producing a second process gas stream, at a second predetermined temperature or temperature range, comprising an increased amount of elemental sulfur and a decreased amount of unreacted $H_2S$ relative to the amounts of elemental sulfur and $H_2S$ in the first process gas stream. In some embodiments, the process includes maintaining a gas hourly space velocity of the first process gas stream in the first Claus reaction zone of at least 5,000 $h^{-1}$. The process further includes: (e) in the second temperature-control zone, adjusting the temperature of the second process gas stream so that elemental sulfur condenses from the second process gas stream at a third predetermined temperature or temperature range; and (f) recovering liquid sulfur from the first liquid sulfur outlet.

In certain embodiments, in step (c), the first predetermined temperature or temperature range is in the range of about 400-650° F. (204-343° C.). In certain embodiments, step (d) comprises adjusting the temperature of the first Claus catalytic reaction zone to a temperature or temperature range in the range of about 500-600° F. (260-315° C.). In certain embodiments, the system employed in the process further comprises a second Claus catalytic reaction zone in serial flow arrangement between the first vapor-liquid sulfur separation zone and the first effluent gas outlet. The process further includes (g) in the second Claus catalytic reaction zone, producing a third process gas stream comprising an increased amount of elemental sulfur and a decreased amount of unreacted $H_2S$ relative to the amounts of elemental sulfur and $H_2S$ in the second process gas stream. In some embodiments, a gas hourly space velocity of the second process gas stream is maintained in the second Claus reaction zone of at least 3,000 $h^{-1}$.

In some embodiments, the temperature of the second process gas stream is adjusted to the third predetermined temperature or temperature range in the range of 400-500° F. (204-260° C.) before the second process gas stream enters the second Claus reaction zone. The process further comprises (h) in the third temperature-control zone, adjusting the temperature of the fourth process gas stream to a predetermined temperature or temperature range in the range of 255-300° F. (124-149° C.), more preferably 270-290° F. (132-143° C.) such that elemental sulfur condenses from the fourth process gas stream to yield an effluent gas stream and liquid sulfur; (i) recovering liquid sulfur from the second liquid sulfur outlet; and (j) optionally, subjecting the effluent gas stream to tail gas treatment.

In certain embodiments, the system employed in the aforementioned process comprises a primary structure containing the catalytic partial oxidation reaction zone, first temperature-control zone, first Claus catalytic reaction zone, second temperature-control zone, first vapor-liquid sulfur separation zone, first liquid sulfur outlet and first effluent gas outlet, and also comprises a secondary structure in fluid flow communication with the first effluent gas outlet, the secondary structure comprising a second Claus catalytic reaction zone comprising a gas temperature-regulation device upstream of the catalytic reaction zone, a third temperature-control zone, a second vapor-liquid sulfur separation zone, a second liquid sulfur outlet, and a second effluent gas outlet.

In certain embodiments, the system employed in the process also includes an inclined channel comprising an auxiliary temperature-control zone. The channel interconnects the first and second structure.

In some embodiments an above-described process includes maintaining a temperature or temperature range in the range of about 1,200-2,700° F. (649-1,482° C.) in the catalytic partial oxidation reaction zone, preferably about 1,500-2,400° F. (816-1,315° C.). These and other embodiments, features and advantages will be apparent with reference to the following detailed description and drawings.

BRIEF DESCRIPTION OF THE DRAWINGS

For a more detailed description of the present invention, reference will now be made to the accompanying Figures, wherein.

DETAILED DESCRIPTION OF PREFERRED EMBODIMENTS

Definitions

Figure 1:
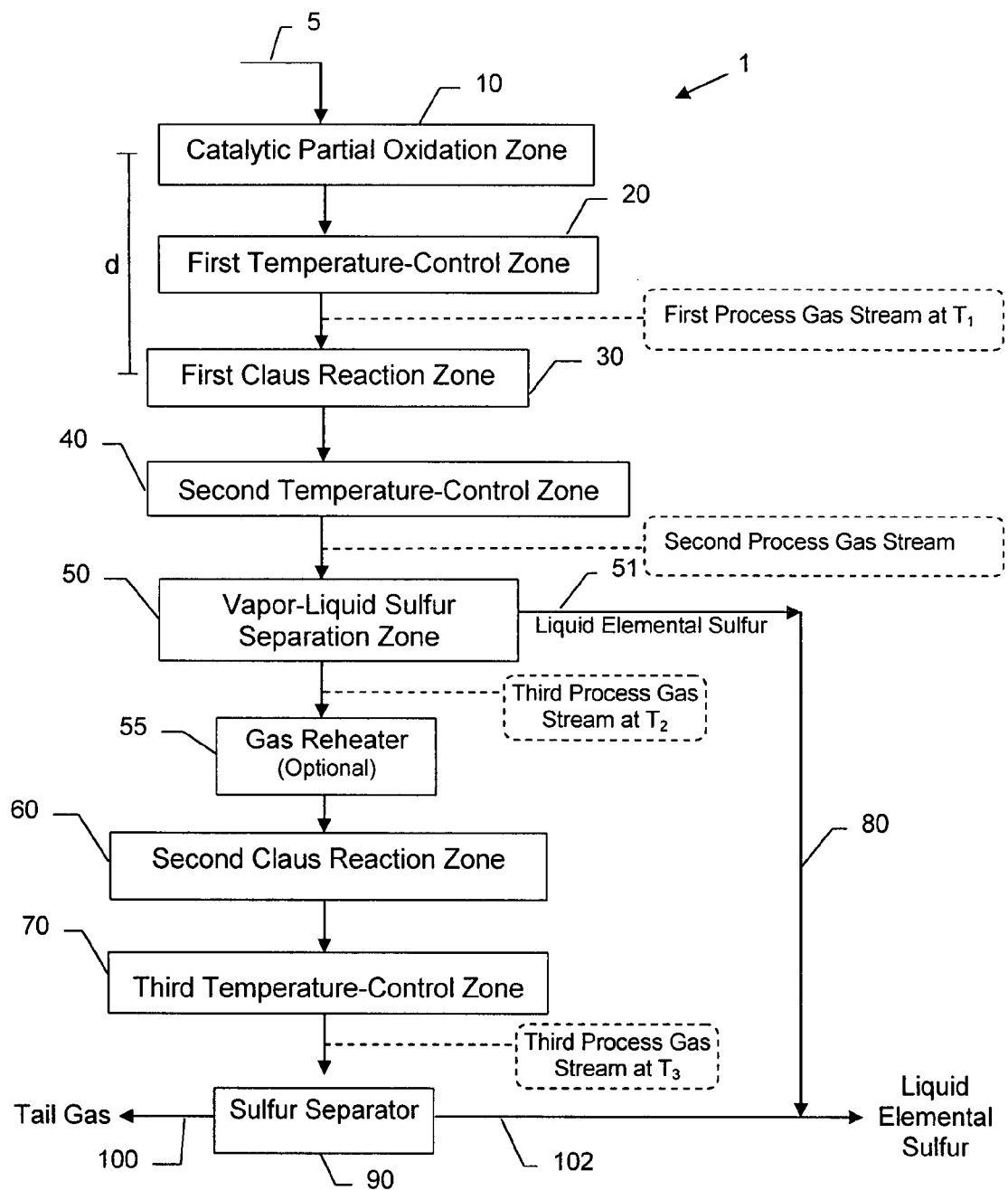
FIG. 1 is a block diagram of a sulfur recovery system in accordance with the present invention.

As used herein in the context of conversion of $H_2S$ primarily to elemental sulfur, the catalytic partial oxidation (CPOX) process is carried out in a short contact time reactor (SCTR). The terms "short contact time reactor" and "short contact time process" refer to the conversion of the reactant to products through the addition of oxygen gas in a reactor consisting of a selective solid-phase catalyst bed by limiting the contact time of the gases with the catalyst particles to control the reaction selectivity. Generally, the reactor must be capable of withstanding the high temperatures resulting from the exothermic oxidation reactions, ranging from the typical feed temperature of less than 200° C. up to 1,000° C. or even up to 1,500° C., marked by a sharp temperature rise at the catalyst-gas interface. Furthermore, to allow for a thermal barrier between the high temperature catalyst bed and the low temperature metal walls, the reactor is lined with inert refractory, capable of withstanding the high temperatures and the large cross-sectional thermal gradients. It is desirable to provide enough refractory thickness to bring the gas temperature to less than 300° C. at the refractory-metal wall interface.

When H$_2$S and/or hydrocarbons are present in the feed gases, the metallurgy of the reactor wall must be capable of withstanding the corrosion from possible formation of sulfur and/or carbon compounds. Common problems include corrosion from acidic sulfur compounds and metal dusting from carbon compounds. To selectively carry out the desired partial oxidation reaction, the catalyst bed and the reactor arrangement is designed to minimize the contact time between the feed gases and catalyst particles. This requires the capability of the reactor to operate at very high flow rates or gas hourly space velocities without causing physical damage to the catalyst bed and/or without snuffing the reaction. This also requires mechanically strong catalyst supports to hold the catalyst bed in place. The catalyst bed and reactor arrangement must be capable of operating with minimal pressure drop to allow for high throughput operation. This is generally achieved by designing the catalyst bed with high porosity, smooth, non-powder and attrition-resistant catalyst particles. The SCTR is designed such that the reaction components are able to flow freely with minimal resistance both upstream and downstream of the catalyst bed. The design of a short contact time reactor also minimizes dead spaces where pooling or stagnation of the reactant gases could occur and where undesirable gas-phase side reactions could occur. The design of a short contact time reactor also provides for rapid mixing of the reactant gases immediately before or at the time of contacting the catalyst. Contact time is calculated as the inverse of gas hourly space velocity (GHSV), and GHSV is calculated as the ratio of combined feed gas volumetric flow rate to the catalyst bed volume.

The terms "discrete" or "divided" structures or units refer to catalyst devices or supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters. The term "monolith" refers to any singular piece of material of continuous manufacture such as solid pieces of metal or metal oxide or foam materials or honeycomb structures.

Description

Compact Sulfur Recovery Plant

Figure 2:
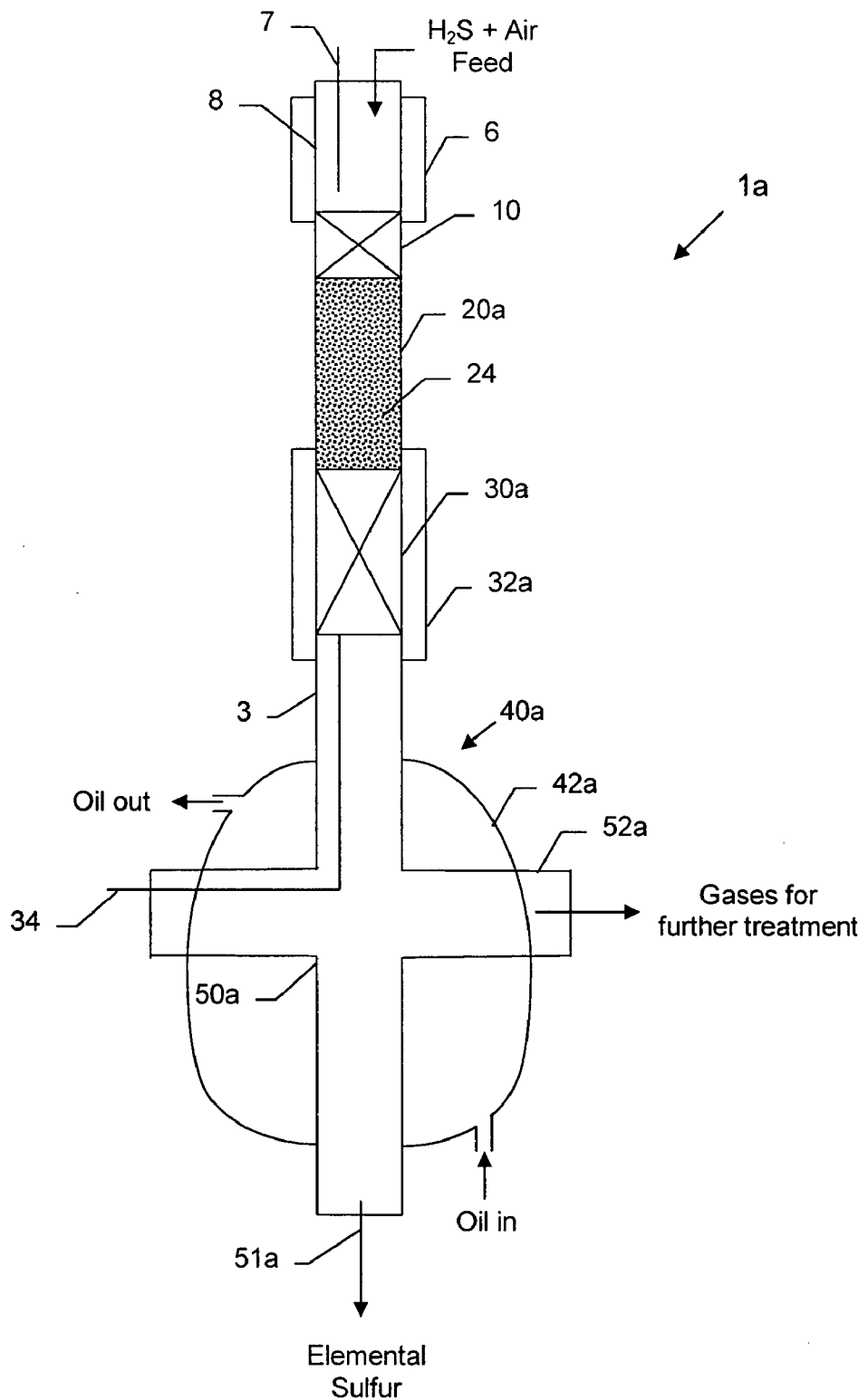
FIG. 2 is a schematic illustration of a sulfur recovery system comprising an oxidation zone, first temperature-control zone, a Claus catalytic reaction zone, and a second temperature-control zone.

Referring to the block diagram in FIG. 1, an exemplary sulfur recovery plant or system 1 includes the following basic units: a catalytic partial oxidation (CPOX) reaction zone 10, first temperature-control zone 20, first Claus catalytic reaction zone 30, second temperature-control zone 40 and vapor-liquid sulfur separation (VLS) zone 50. Although the individual zones or units can be oriented or stacked horizontally, vertically, or in any suitable configuration consistent with serial flow, it is preferred that the units are arranged vertically in the sequence given. Among other features and advantages of this arrangement, it provides for smaller footprint and uses the force of gravity to assist in recovering condensed liquid sulfur when the system is operated to recover sulfur from H$_2$S. An exemplary process for recovering elemental sulfur from an H$_2$S-containing gas stream is described in a following section titled "Process for Recovering Sulfur from an H$_2$S-containing Stream." Preferably, at least the basic units of sulfur recovery system 1, comprising reaction zones 10 and 30 and temperature-control zones 20 and 40, are contained in a single vessel 3 configured for vertical downward flow, as illustrated in FIG. 2 for a laboratory-scale reaction system.

Figure 3:
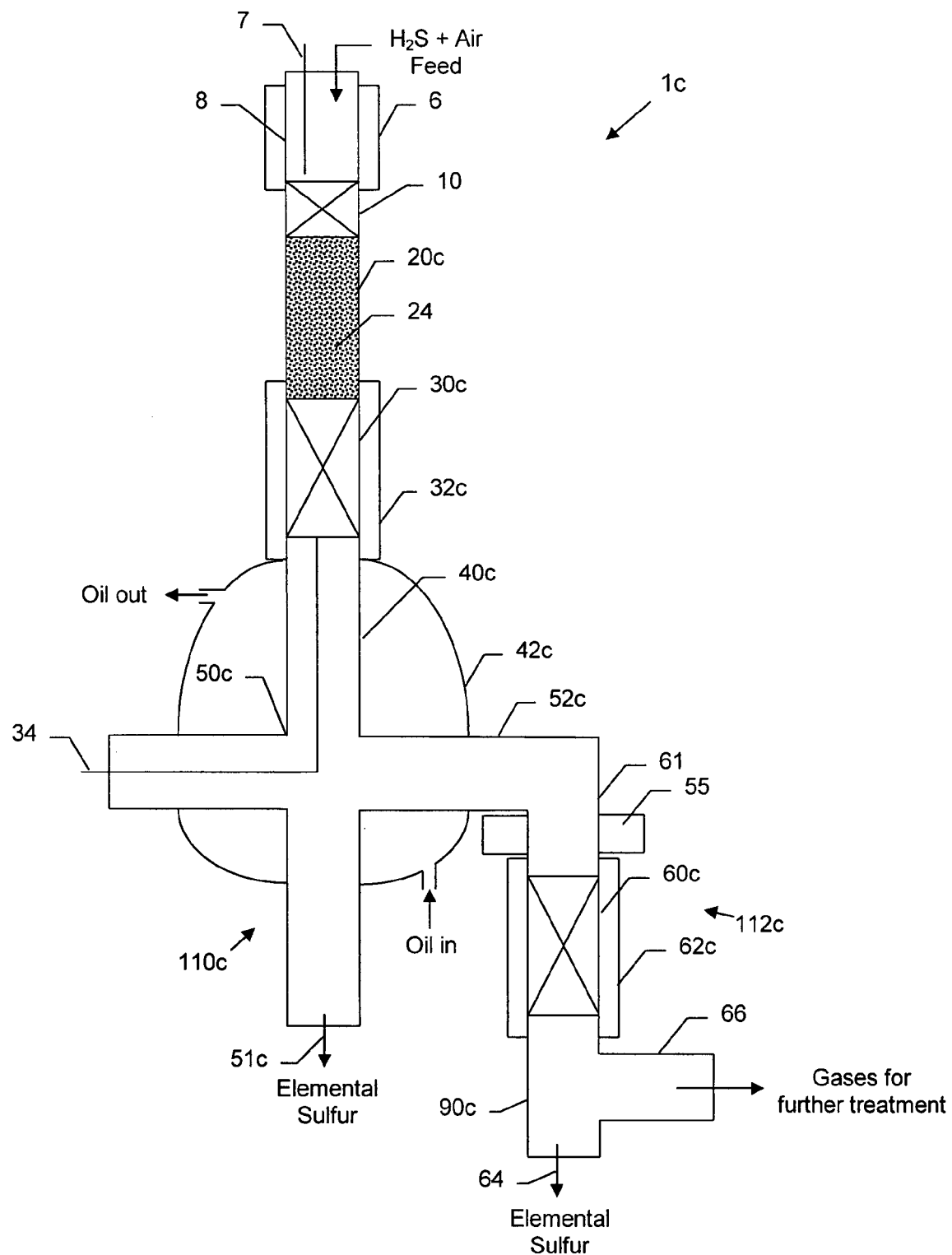
FIG. 3 is a schematic illustration of another embodiment of a sulfur recovery system comprising an oxidation zone, first and second temperature-control zones and first and second Claus catalytic reaction zones.
Figure 4:
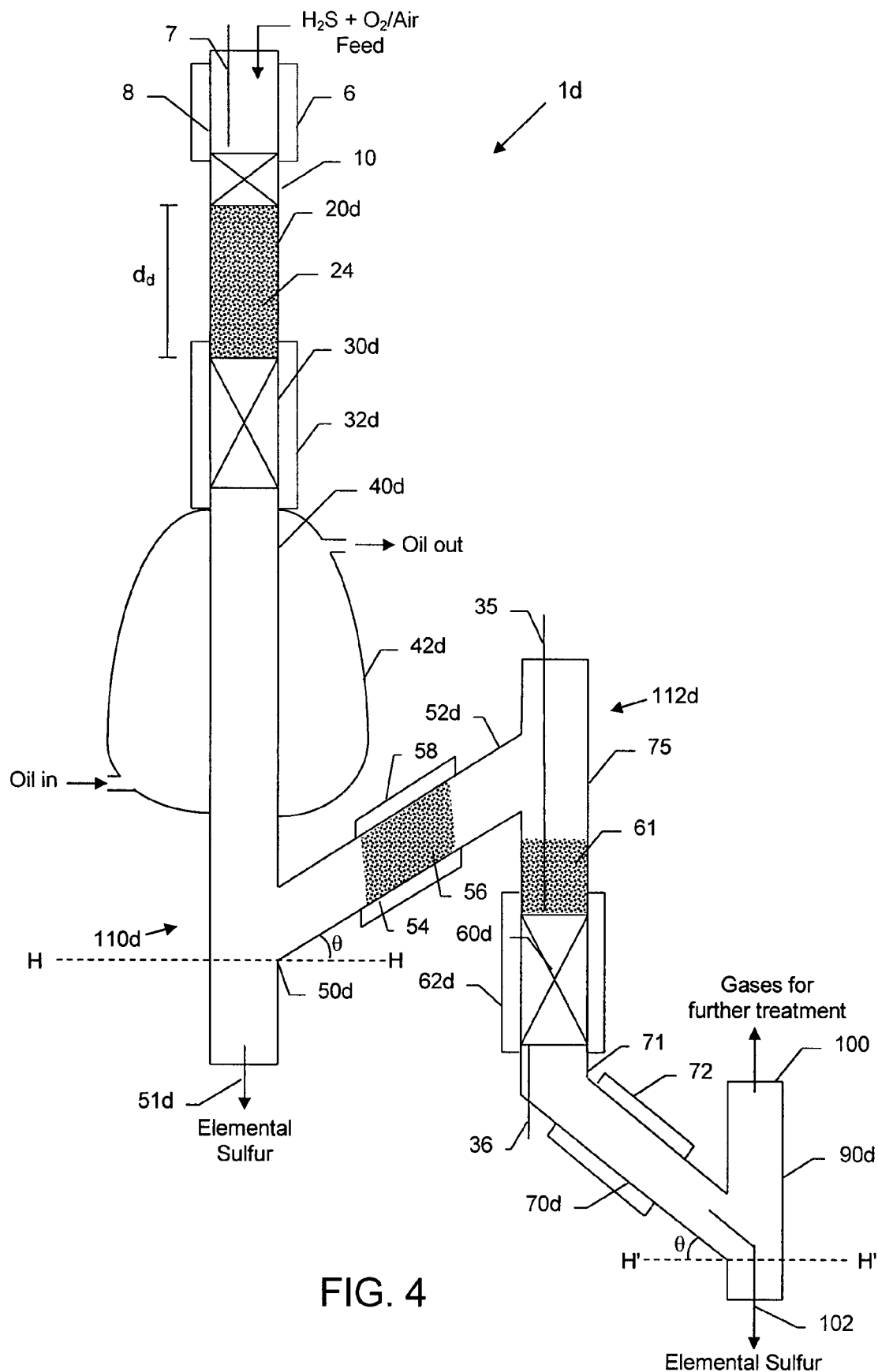
FIG. 4 is a schematic illustration of a third embodiment of a sulfur recovery system comprising an oxidation zone, first and second temperature-control zones, first and second Claus catalytic reaction zones, and inclined gas flow pathways to facilitate gravity-assisted separation of liquid sulfur.
Figure 5:
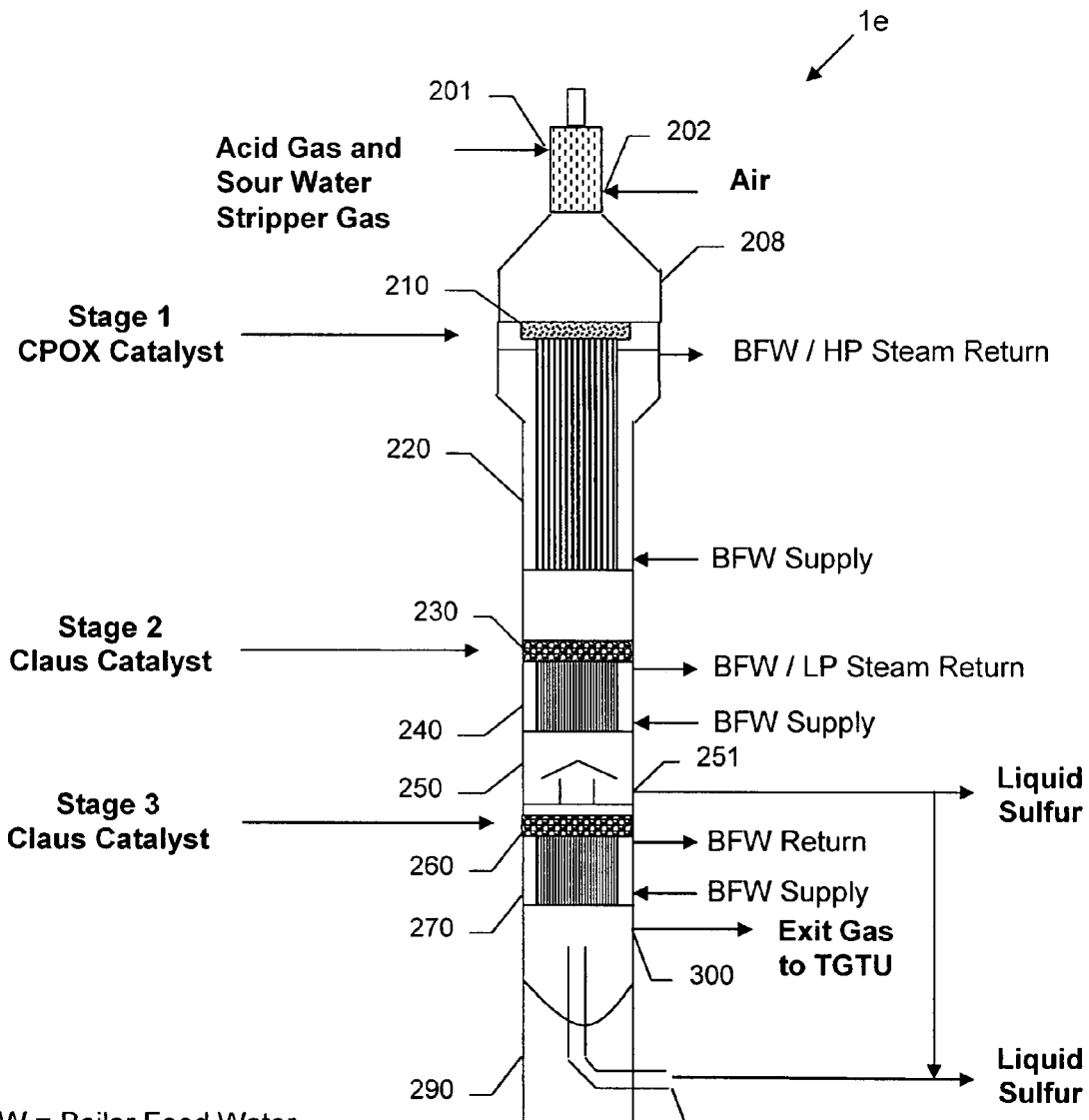
FIG. 5 is a schematic illustration of a compact sulfur recovery plant for operation of a sulfur recovery process.

FIG. 5 illustrates a compact sulfur recovery plant 1e, having correspondingly-numbered units and an additional Claus catalytic reaction zone 260 and a first sulfur condenser 240, configured as a single vertically stacked configuration. This configuration supports a process having a First Stage (CPOX) (in zone 110), a Second Stage (Claus Catalyst) in zone 230, and a Third Stage (Claus Catalyst) in zone 260. Alternatively, the basic units are contained in a primary vertical structure 110c or 110d and one or more additional Claus reaction zone and/or temperature-control zone is located in a secondary vertical structure 112c or 112d, as illustrated in FIGS. 3 and 4, respectively, for a laboratory-scale reaction system. In any case, the multiple catalyst beds and temperature control zones together comprise a compact arrangement for a sulfur recovery plant.

The vessel 3 (FIG. 2) is preferably a continuous, tube-like structure made of materials capable of withstanding the temperatures generated by the exothermic catalytic partial oxidation reaction (Equation 4). For operation at pressure, the reaction vessel is preferably constructed to withstand not only the elevated temperatures of the partial oxidation process but also to withstand feed gas pressures up to at least 3 atmospheres and to resist corrosive effects of sulfur-containing compounds (e.g., sulfides). Preferably the vessel is fabricated of carbon steel, or another suitable metallurgy, with a refractory lining to protect the metal from direct contact with the gas at the elevated temperatures. For example, the entire vessel may be most economically constructed from carbon steel, with only the components that will be exposed to temperatures above 650° F. (343° C.) protected using 94% alumina content refractory. Other suitable refractory materials are also commercially available. Substitution of stainless steel for carbon steel is optional but less preferred due to the increased cost. The CPOX reaction zone 10 may be similar to the reaction zones of the short contact time partial oxidation reactors that are described in U.S. Pat. No. 6,800,269 and U.S. Pat. No. 6,946,111 (ConocoPhillips Company). The disclosures of those patent documents are hereby incorporated herein by reference. Alternatively, any suitable short contact time reactor configuration may be employed for mixer 8 and zone 10. In FIGS. 2, 3 and 4, configurations are shown in which CPOX reaction zone 10 is preceded by mixing zone 8, which comprises inlets for H$_2$S and O$_2$/air. Mixing zone 8, or a portion thereof, is preferably capable of being temperature controlled via heater 6 (FIGS. 2, 3 and 4) based on the temperature measurement device 7. Alternatively, the feed gases and air can be preheated separately using steam, electric or other options, prior to entering the mixing zone.

CPOX zone 10 includes a catalyst bed comprising a thin, porous ceramic thermal shield or barrier (not shown), and a catalyst that favors the direct partial oxidation of H$_2$S according to Equation 4 at elevated temperatures (i.e., above about 932° F. (500° C.), preferably in the range of about 1,200-2,700° F. (649-1,482° C., more preferably between about 1,500-2,400° F. (816-1,315° C.). The catalyst bed also comprises a thin, porous ceramic floor (not shown) to contain the catalyst. The catalyst bed may be arrayed in a horizontal (disk) or a vertical (tube) orientation; however the vertical orientation is preferred to avoid bypassing of the catalyst bed in the event of catalyst settling during operation. Suitable catalyst compositions and geometries are discussed in more detail in the section titled "Catalysts for H$_2$S Partial Oxidation", below.

First Temperature-control Zone. Referring to FIG. 1, the first temperature-control zone 20 comprises a region between CPOX reaction zone 10 and Claus reaction zone 30 for obtaining a desired temperature at the inlet of the First Claus catalyst by controlling the amount of heat transferred from the process gas to a surrounding heat transfer fluid (e.g., air, water, steam, or heat transfer oil). The temperature control zone can be as simple as a quartz tube exposed to ambient air, as in a laboratory setting, with heat transfer taking place by convection and radiation from the inside of the tube to the ambient air, and adjusting the length of tube exposed. Alternatively, the temperature control zone can be a more conventional shell and tube heat exchanger, especially for large scale applications. A suitable shell and tube heat exchanger for the first temperature control consists of a refractory lined inlet tube sheet, tubes, and outlet tube sheet inside the main vessel surrounded by a heat transfer medium such as boiling water or heat transfer oil. A temperature measuring device located at the exit of outlet tube sheet is used to drive a controller to regulate the pressure of the boiling water or flow of heat transfer oil to maintain the desired inlet temperature to the first Claus catalyst reactor bed.

As illustrated in FIG. 2, in one example of the new sulfur recovery system, denoted 1a, the tube or tubes of first temperature-control zone 20a preferably includes a filler of inert, solid refractory heat transfer enhancement material or medium (HTEM) 24 that is capable of accelerating the rate of heat transfer from the effluent gases when the system is in operation, further reducing the size of the overall sulfur recovery unit.

First Claus Catalytic Reaction Zone. Referring again to the block diagram of FIG. 1, after first temperature-control zone 20 is a first Claus catalytic reaction zone 30 that contains a catalyst capable of catalyzing the Claus reaction (Equation 2), preferably a conventional Claus catalyst. Notably, there is no provision for removal of elemental sulfur from the effluent gases ahead of the first Claus catalytic reaction zone 30 in the present system. This constitutes a major departure from conventionally designed sulfur recovery plants. As is known from the computations of Gamson and Elkins (*Chemical Engineering Progress* (1953) 49:203-215) and others, the conversion of $H_2S$ and $SO_2$ to sulfur via the Claus reaction (Equation 2) is improved at lower temperatures. For this reason, the first Claus catalyst bed(s) of conventional Claus sulfur recovery processes have customarily been designed to operate at the lowest possible temperature that is above the dew point of the gas leaving the preceding reactor, in order to prevent liquid sulfur from coating the Claus catalyst. It is widely perceived that Claus catalyst performance is inhibited by the presence of liquid sulfur. Accordingly, the customary practice is to design the Claus catalytic reactors to receive gas feeds that are substantially free from elemental sulfur because elemental sulfur in the reactor feed prevents the equilibrium of Equation 2 from shifting to the right. As can been seen in FIGS. 1-5, the present sulfur recovery system designs differ from conventionally designed sulfur recovery plants, not only in the location of a CPOX reaction zone at the front of the system in place of the usual free flame combustion chamber. Another unique feature of the present system is that there is no need for removal of sulfur produced in the initial thermal stage, i.e., the CPOX reaction zone 10, prior to reacting the effluent in a Claus catalytic reaction zone 30, 30a, 30c or 30d. Still another feature of the new sulfur recovery system, as shown in FIGS. 2-4, is the optional heating/cooling jacket 32a, 32c or 32d for regulating the temperature of the Claus catalyst in reaction zone 30a, 30c or 30d during operation of the system. Preferably the Claus catalyst temperature is controlled by any suitable means, preferably at about 400-650° F. (232-315° C.), more preferably 500-600° F. (260-315° C.). The Claus catalyst may be arranged in a horizontal (disk) orientation or a vertical (tube) orientation; however the vertical orientation is generally preferred.

Second Temperature-control Zone. Referring to FIG. 1, a second temperature-control zone 40 preferably follows Claus catalytic reaction zone 30, for receiving, cooling and controlling the temperature of the effluent from zone 30.

First Sulfur Separator. Following second temperature-control zone 40 is sulfur separation zone (vapor-liquid sulfur separator) 50 with a liquid sulfur outlet 51 (FIG. 1). FIG. 2 shows a simple arrangement in which, following Claus reaction zone 30a, the vessel or tube 3 branches to form a sulfur separation zone 50a comprising a liquid sulfur outlet 51a and a gas outlet 52a. A second temperature-control zone 40a which includes coolant jacket 42a, encloses the sulfur separation zone 50a and at least a portion of the adjacent vessel between zone 30a and outlet 52a. Preferably the vapor-liquid separation zone is configured to operate in co-current downward flow mode, to deter re-entrainment of liquid sulfur in a gas stream exiting the separation zone. Preferably, configuration of the vapor-liquid separation zone promotes liquid drainage along a separate path than that of gas flowing to the gas outlet, in practice. The vapor-liquid separation zone preferably also configured to deter liquid sulfur accumulation in the sulfur separation zone.

Alternatively, the second temperature-control zone may comprise a heat exchanger using boiling water, liquid water, or a heat transfer oil on the outside of the process gas tube to remove heat from the process gas and effect the condensation of the sulfur formed in the catalytic reaction zones 10 and 30, or the corresponding zones in FIGS. 2-4.

A representative system 1c is illustrated in FIG. 3, in which second cooling zone 40c, commencing immediately after Claus reaction zone 30c, is enclosed in coolant jacket 42c. Sulfur separation zone 50c is also enclosed by jacket 42c. In FIG. 4 still another alternative configuration is shown in which, similar to FIG. 3, the second cooling zone 40d commences immediately after Claus reaction zone 30c, and sulfur separation zone 51c is outside of cooling zone 40c.

Gas Pre-heater. Optionally, a gas preheater 55 (FIGS. 1, 3 and 4) is located between the primary and secondary structures 110c and 112c in FIG. 3 and between 110d and 112d in FIG. 4, for preheating the gases after leaving the vapor-liquid separation zone 50c in FIG. 3 and 50d in FIG. 4 and prior to entering the second Claus reaction zone 60c in FIG. 3 and 60d in FIG. 4.

Second Claus Catalytic Reaction Zone. In configurations illustrated in FIGS. 1, 3 and 4, in addition to the basic components of the new sulfur recovery system, i.e., partial oxidation reaction zone, first and second temperature-control zones, and first Claus catalytic reaction zone, the new sulfur recovery system further includes, a second Claus catalytic reaction zone 60, 60c or 60d following the second temperature-control zone 40, 40c or 40d, respectively, for further reacting $H_2S$ and $SO_2$ in the effluent from zone 40, 40c or 40d. In the system of FIG. 3 the above-mentioned basic components comprise a vertically oriented primary structure 110c. A vertically oriented secondary structure 112c is in fluid flow communication with primary structure 110c by way of the gas outlet 52c, which preferably takes the form of a channel or elbow that connects to the upper portion of secondary structure 112c. The length of the channel is preferably sufficient to disengage any sulfur from the vapor phase, to achieve separation. To facilitate that result, preferably at least a portion of channel 52c is enclosed by jacket 42c.

Secondary structure 112c is oriented vertically and configured for downward flow of the process gases from primary structure 110c. Inside secondary structure 112c is second Claus catalytic reaction zone 60c, which is preferably like the first Claus catalytic reaction zone 30c. Optionally, it can be surrounded by a heating/cooling device 62c.

The system schematically shown in FIG. 4 comprises a vertically oriented primary structure 110d and an adjacent vertically oriented secondary structure 112d that is in fluid flow communication with primary structure 110d by way of outlet or channel 52d. The primary structure contains CPOX reaction zone 10, first temperature-control zone 20d, and first Claus catalytic reaction zone 30d with optional heating/cooling jacket 32d, and second temperature-control zone 40d. Below second temperature-control zone 40d the primary structure or vessel 110d is joined to an outlet or channel 52d, for carrying effluent gases to the secondary structure 112d. Primary structure 110d then terminates with liquid sulfur outlet 51d. Channel 52d is preferably inclined at an upward angle extending from near the terminus of primary structure 110d at sulfur outlet 51d to the upper end of secondary structure 112d. The angle of channel 52d is preferably greater than 5 degrees and less than 90 degrees, in order to satisfactorily drain condensed sulfur away from the gas stream. Secondary structure 112d is oriented vertically and configured for downward flow of the process gases from primary structure 110d. Optionally, an auxiliary temperature-control zone 54d containing a bed of HTEM 56 fills at least a portion of channel 52d. Surrounding zone 54d is heating/cooling jacket 58. The angle of incline of connector 52d must be sufficient, preferably optimal, for obtaining gravity-aided flow of condensed sulfur from zone 54 to sulfur outlet 51d when the system is operated for its intended purpose.

In secondary structure 112d is second Claus catalytic reaction zone 60d, which may be similar to the first Claus zone 30d, and may be surrounded by a heating/cooling device 62d.

Third Temperature-control Zone. Referring again to FIG. 1, preferably the sulfur recovery system continues with a third temperature-control zone 70 for receiving, cooling and controlling the temperature of the effluent from second Claus catalytic reaction zone 60. A second sulfur separator 90 is included for receiving effluent from the third temperature-control zone 70. An outlet 100 for tail gas and an outlet 102 for liquid elemental sulfur follow. The liquid sulfur outlet 51 preferably connects with sulfur outlet 102 via a conduit 80. In the configuration shown in FIG. 4, after zone 60d, the secondary structure or vessel 112d continues with a channel 71 that is oriented at a downward angle (θ) and connects to a sulfur separator 90d, having outlet gas channel 100 and a sulfur outlet 102. The downward angle (θ) is preferably greater than about 5 degrees and less than about 90 degrees with the horizontal plane relative to the plane of the primary structure. Surrounding temperature-control zone 70 is coolant jacket 72. The downward angle of channel 71 is such that, when the apparatus is in use, the flow of condensed liquid sulfur from zone 60d and a third temperature-control zone 70d is aided by the force of gravity on the condensed sulfur.

Second Sulfur Separator. A second sulfur separator 90 is employed between third temperature-control zone 70 and outlets 100 and 102 (FIG. 1). As shown in FIG. 3, in secondary structure 112c, following zone 30c is preferably a third temperature control zone (not shown) that is similar to 42c, and a sulfur separator 90c with a liquid sulfur outlet 64 and a gas outlet 66. Sulfur separator 90 may be like sulfur separator 50 or any conventional vapor-liquid separation device. In FIG. 4, following zone 70d, is sulfur separator 90d having a gas outlet 100 and a liquid sulfur outlet 102.

Heating/Cooling Devices. Referring to FIGS. 2, 3 and 4, heating/cooling jackets 42a, 42c and 42d, are for receiving and circulating a heat transfer liquid, or provide heat by other means such as an electric heating element. Suitable heating and/or cooling devices such as electric heaters, temperature controlled heat transfer fluid systems, or conventional shell and tube heat exchangers using water or steam are known to those of skill in the art. Temperature sensors 7, 34, 35 and 36 are operationally coupled to the heating and/or cooling device, which is capable of being preset to maintain the process fluid at a predetermined temperature.

Although the present sulfur recovery system preferably contains the various reaction zones and temperature-control zones in a single multi-stage vessel configured for vertical downward flow, it should be appreciated that for ease of servicing, one or more reaction zone and/or temperature-control zone may instead be configured as a removable, replaceable unit. In that case, the separate units are releasably connected to (an) adjacent unit(s) to make up one or more structure. For example, a primary structure can be connected to a secondary structure, analogous to the configurations shown in FIGS. 3 and 4.

Replaceable Units. Referring to FIG. 5, a compact, stacked sulfur recovery plant is shown which comprises components schematically illustrated in FIG. 1, in a single, vertically stacked configuration. The components, or groups of components, may be configured as replaceable units, as may sometimes be preferred, especially for use in larger scale operations of this sulfur recovery process. The sulfur recovery plant 1e, includes a mixing zone 208, having $H_2S$ and $O_2$/air inlets 201, 202, releasably joined to CPOX catalyst zone 210 (Stage 1). Downstream, CPOX reaction zone 210 is releasably joined to first temperature-control zone 220 (waste heat exchanger, WHE). First Claus reaction zone 230 (Stage 2) is releasably connected to WHE 220. Continuing in vertical downward fluid flow arrangement, the first Claus reaction zone 230 is releasably connected to second temperature-control zone 240 (first sulfur condenser), which in turn is releasably connected to the vapor-liquid sulfur separation (VLS) device 250. An optional gas reheater (not shown) is releasably connected to the VLS device and the second Claus reaction zone 260. Liquid sulfur is drained out of the VLS device through conventional arrangements such as SulTrap™ and steam-traced drain lines. Second Claus reaction zone 260 is releasably connected to the second sulfur condenser 270, which is releasably connected to the sulfur separator 290 and tail gas outlet line 300. Liquid sulfur drain line 302 from the second sulfur condenser 270, via sulfur separator 290, is connected to the first sulfur outlet line 251, and the flow of liquid sulfur continues to a sulfur storage vessel (not shown).

It can be readily appreciated that any of the components of the exemplary systems described herein can be made in replaceable modular form for ease of startup and shut down of a operation, and to reduce the time needed for system maintenance. Conversely, for some situations of use it may be advantageous to combine two or more components in a single fixed or replaceable module or vessel. For instance, for short-term operations where modifications are expected, modular design offers advantages.

Temperature Security for the Hottest Parts of the Waste Heat Boiler

In the compact sulfur recovery plant as presented in FIG. 5, it has been recognized that the tube sheet and tubes closest to the CPOX catalyst are subjected to the hottest gases in the plant. While the tube sheet and tubes are provided with water in the waste heat boiler, there exists the possibility for portions may be dry for a brief period of time when steam bubbles may accumulate at the upper portions. When a vapor phase is in contact with the opposite side of the metal tube sheet or tubes, it is quite possible for the temperature of the tube sheet or tubes to undergo a rapid temperature increase that may cause corrosion or other deterioration of the metal. Exotic, high temperature materials may be used for these elements, but certainly at a higher costs. In the event that the water level in the waste heat boiler is allowed to decrease below a completely full level for whatever reason, temperatures can easily be reached that are higher than recommended for the materials being used for these critical items.

Figure 6:
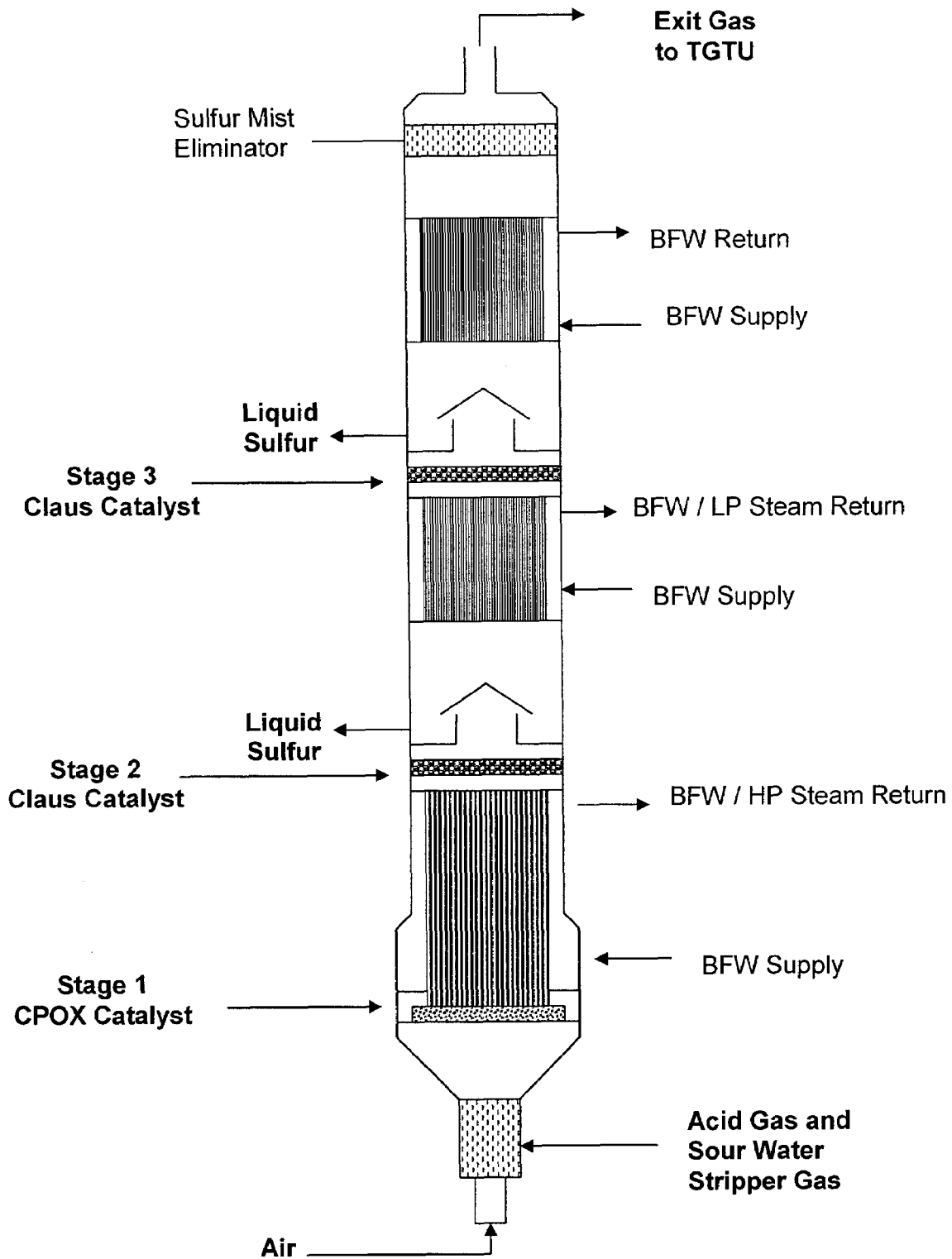
FIG. 6 is a schematic illustration of the compact sulfur recovery plant in accordance with the preferred embodiment of the present invention.
Figure 7:
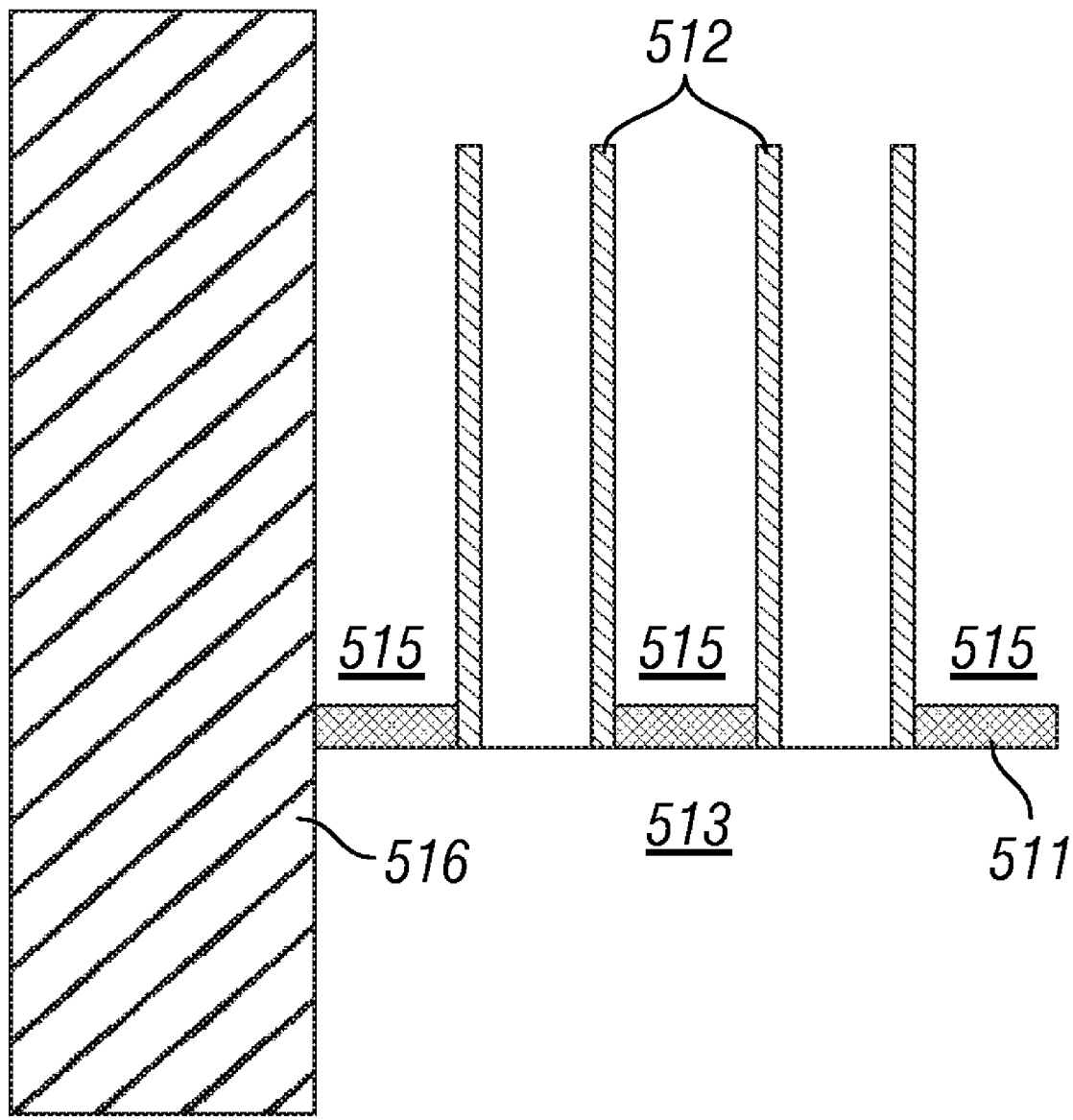
FIG. 7 is a fragmentary schematic illustration of the tube sheet with tubes in the compact sulfur recovery plant in accordance with the preferred embodiment of the present invention.

In an improved arrangement for the compact sulfur recovery plant, referring now to FIG. 6, a plant is illustrated that is essentially similar to the plant in FIG. 5 where the inlet is at the bottom. The advantage to an upflow system is primarily that the hottest gases contact the tube sheet at the bottom of the waste heat boiler. Water in the waste heat boiler would naturally be in continuous contact or nearly continuous contact, due to gravity and any vapor bubble that forms would rapidly rise from the tube sheet and bottom of the tubes. Referring to FIG. 7, the plant wall 516 contains the reaction where hot gases from the CPOX catalyst approaches the tube sheet 511 from below. The tubes 512 are positioned in the tube sheet so as to seal off the gas space 513 from the water/steam jacket 515. The junction of the tubes 512 to the tube sheet 511 can be accomplished as is well know in the art to attain a good seal in spite of the high demand for tolerance of pressures and temperatures. The water at the base of the water/steam jacket 515 naturally maintains a more constant and stable temperature with gravity urging the water in contact with the tube sheet 511.

Catalysts for $H_2S$ Partial Oxidation

The oxidation catalyst employed in the first catalyst bed preferably comprises one or more active component selected from the Group VIII metals (Periodic Table of the Elements, CRC Handbook of Chemistry and Physics, 82nd ed., CRC Press, New York), and oxides thereof; a refractory support, having a surface area greater than 0.1 $m_2/g$; and a support modifier selected from the alkaline metals, and oxides thereof. Preferred Group VIII metals are Pt, Rh, Ir, Ru, Pd, Ni, Co, Mn, Zn and Cu, more preferably Pt, Rh, Ir and Ru. Pt and Rh are most preferred. Preferred refractory supports comprise MgO, $Al_2O_3$ or $ZrO_2$. A support modifier, when present, is preferably one or more of Mg, Ca, Y and the lanthanide series of metals, more preferably Mg and/or Ce.

The catalyst must be capable of withstanding operating temperatures up to 1,500° C. and up to 10,000,000 $h^{-1}$ feed GHSV without significant mechanical or thermal degradation. The catalyst is preferably a suitable preformed shape, such as extrudates, spheres, granules, trilobes and the like, that can form a bed capable of allowing the gases to flow through at a GHSV in the range of about 20,000 $h^{-1}$ to about 10,000,000 $h^{-1}$ without causing a pressure drop of more than 2 psi across the bed. Alternatively, the catalyst employed in zone 10 or 210 of the above-described system and process can have any suitable geometry that permits a high enough gas flow rate and short enough residence time on the catalyst to favor the partial oxidation reaction (Equation 4) rather than combustion (Equation 1). For example, the catalyst could be in the form of one or more layers of wire gauze, a monolith, or a bed of discrete or divided structures that is held between two porous refractory disks. Monoliths and structured packing of the catalyst bed(s) having open, porous structures (e.g., with high surface area particles) are preferred because the pressure drop through those geometries is generally lower than with beds of individual particles. This difference is appreciable when the sulfur recovery plant is operated at pressures in excess of 2 atmospheres and at gas hourly space velocities of about 500,000 $h^{-1}$ or more. The size and number of heat exchanger tubes and the total depth and form of the partial oxidation and Claus catalysts (e.g., horizontal disks or multiple vertical tubes) are preferably configured to match the specific capacity requirements and the available pressure drop for the sulfur recovery system, as applicable in a particular situation of use. Determining appropriate orientations, sizes and numbers of catalyst beds is within the skill of engineers working in the field of sulfur recovery operations. The catalyst is preferably configured so that only a first fraction of the feed gas mixture contacts the catalytically active surfaces while the balance of the reactant gas mixture serves to quickly cool the first fraction and prevent the oxidation reaction from proceeding too far in the first reaction zone. Some suitable partial oxidation catalysts that may also be used in the present CPOX reaction zone 10 or 210, and their manner of making, are described in U.S. Pat. No. 6,946,111, U.S. Pat. No. 6,800,269 and U.S. Ser. No. 10/317,936 filed Dec. 12, 2002 (ConocoPhillips Company), the disclosures of which are hereby incorporated herein by reference.

Claus Catalysts

As mentioned above, the Claus catalytic reaction zones 30, 60, 230 and 260 contain a catalyst that is active for catalyzing the Claus reaction (Equation 2), and which may be a conventional Claus catalyst as is known in the art. Aluminum oxide and Titanium oxide are representative examples of suitable Claus catalyst components. The catalyst bed can be comprised of conventional packing of the catalyst or it can contain multiple vertically oriented packed tubes preferably comprising individual particles of high surface ceramic material such as gamma alumina, gamma alumina particles deposited on ceramic foam monoliths, or structured ceramic materials coated with particles of gamma alumina. The surface area of the catalyst or catalyst support is preferably higher than 300 $m^2/g$. A typical aged Claus catalyst may have a surface area of 140 $m^2/g$ or more. "Aged" catalyst refers to a catalyst that has been in service and has lost a portion of its original activity due to loss of surface area or due to chemical degradation of the surface, or due to buildup of soot or other deposits. The Claus catalyst must be capable of withstanding operating temperatures up to about 400° C. and GHSVs up to 30,000 $h^{-1}$ without suffering significant mechanical or thermal degradation. The catalyst is preferably a suitable preformed shape, such as extrudates, spheres, granules, trilobes and the like, that can form a bed capable of allowing the gases to flow through at a GHSV of at least 1,000 $h^{-1}$, preferably up to about 20,000 $h^{-1}$, without causing a pressure drop exceeding 2 psi across the bed. For example, catalyst spheres ¼ inch to about ½ inch in diameter have been employed successfully, and are considered representative of other catalyst geometries.

Heat Transfer Enhancement Material

The heat transfer enhancement medium (HTEM) 24, 56 and 61 employed in the above-described temperature-control zones is preferably a refractory ceramic material that is mechanically and thermally resistant to the temperatures, pressures and GHSV's encountered when the sulfur recovery system is in operation. Preferably the material is also chemically resistant or inert to corrosive sulfur-containing compounds and other chemical components of the process gases. A smooth surfaced material that is capable of improving the rapid exchange of heat with the rapidly flowing gases during operation of the sulfur recovery system is preferred. The geometry of the HTEM can be a porous monolith having less than 40 pores per square inch, or can be in the form of a plurality of particulate or divided structures, provided that the monolith or packed bed offers little resistance to flow, or causes only a small pressure drop during operation of the system, preferably no more than a drop of 2 psi across the HTEM bed. The preferred HTEM comprises particles that are ⅛ inch to ½ inch in their longest dimension (e.g., quartz beads ⅛ to ½ inch in diameter). Other suitable HTEMs are mixed oxide ceramics, glass or preformed particles, and other suitable geometries include, but are not limited to, beads, extrudates, rings and coils.

EXAMPLES

Example 1

Sulfur Recovery Process with Partial Oxidation Catalyst Only

Three (3) grams of a representative test catalyst comprising 1% iridium, 2% ruthenium deposited on 2% magnesium-coated magnesium oxide granules (20-30 mesh) (MagChem-10, Martin Marietta Magnesia Specialties, Baltimore, Md.) was employed in a laboratory scale sulfur recovery assembly similar to that depicted in FIG. 2, except that the HTEM bed 24, Claus catalyst reaction zone 30 and heating/cooling jacket 32 were absent. The catalyst composition is mentioned in weight percent (wt %), which refers to the amount of metal component relative to the total weight of the catalyst, including the support, if any.

The catalyst was prepared as described in the section subtitled "Partial Oxidation Catalysts." The laboratory scale sulfur recovery test was carried out using a modified conventional flow apparatus comprising a quartz reactor with a length of about 20 inches, an outside diameter of 0.74 inch and an inside diameter of 0.52 inch. Ceramic foam pieces of 99% $Al_2O_3$ (0.5 inch in diameter×0.4 inch thick, with 80 pores per linear inch) were placed before and after the catalyst as radiation shield and support foams. The catalyst bed contained 3 grams by weight of catalyst, and was approximately 0.5 inch in diameter×1.5 inch in length including the radiation shield and support foams. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater was placed around the quartz tube, providing heat to light off the reaction and preheat the feed gases. The bottom of the band heater corresponded to the top of the upper radiation shield. In the second part of the assembly, beginning about 3 in. downstream from the catalyst and extending for the remainder of the length of the quartz tube, the tube was surrounded by a cooling jacket containing Dowtherm™ Silicone oil coolant, which cooled the hot effluent to a temperature in the range of about 275 to 400° F. (135-204° C.), preferably about 300° F. (149° C.), and condensed elemental sulfur. The reacted gases exited the tube, and were routed to a vent scrubber and sampled for gas chromatography. The condensed liquid sulfur, aided by the vertical orientation of the apparatus and the force of gravity, flowed into a sulfur receiver. The test runs were conducted at a volumetric air to $H_2S$ ratio of 2.25, and at the $H_2S$ flow rates indicated in Table 1. A partial oxidation catalyst preheat temperature of 450° F. (about 232° C.) and 5 psig operating pressure was employed. The effluent from the assembly after approximately 1 hour on stream at the specified conditions was analyzed using a gas chromatograph equipped with a thermal conductivity detector. The baseline data for the partial oxidation reaction stage only, followed by rapidly cooling to about 300° F. (149° C.), is reported in Table 1. The product was similar to that produced in a free flame combustion zone of a conventional Claus sulfur recovery plant, however there was a 5-10% improvement in sulfur recovery efficiency with the new system. In representative tests, the sulfur yield was greater than 70% and the $H_2S$ conversion was greater than 80% at a space velocity greater than 80,000 $h^{-1}$ in the first catalyst bed.

Example 2

Sulfur Recovery Process with Partial Oxidation Catalyst and Downstream Claus Catalyst To the test assembly of Example 1 was added a Claus catalyst comprising a 9 gram bed (about 0.5 inch diameter×3 inches long) of 1 mm (average) diameter gamma alumina spheres (Sasol) in the quartz tube downstream from partial oxidation catalyst, similar to the configuration shown in FIG. 2, except that the HTEM bed 24 and heating/cooling jacket 32 were absent. The top of the Claus catalyst was located about 3 in. from the outlet of the partial oxidation catalyst bed. The portion of the quartz vessel containing the Claus catalyst was also enclosed in an oil-cooled jacket similar to jacket 42a, to maintain it at a lower temperature. Ceramic foam pieces were placed at the top and bottom of the Claus catalyst. The test data for the catalytic partial oxidation reaction, followed by cooling to about 450° F. (232° C.), Claus reaction and sulfur condensation and removal, is reported in Table 2. In this study, the Claus catalytic partial oxidation stage was operated at a temperature that encouraged sulfur to condense in the catalyst bed, and the Claus reaction was carried out without removing the sulfur produced from the previous (partial oxidation) stage. As shown in Table 2, under conditions that run counter to conventional Claus processes, better $H_2S$ conversion, better sulfur yield, and lower $SO_2$ production were obtained, compared to the results shown in Table 1 with catalytic partial oxidation and sulfur condensation alone. This configuration gave an improvement of about 8% in sulfur yield, going from about 72-75% with the single partial oxidation bed of Example 1, to about 83% with the instant two-catalyst system. Surprisingly, the increased sulfur yield was observed even though condensed liquid sulfur was present in the second catalyst bed. Despite the presence of liquid sulfur, the Claus catalyst retained its activity over several hours of operation during the test.

Example 3

Selective Staging of the Two Catalyst Bed System

In the study described in Example 2, even though the portion of the vessel containing the Claus catalyst bed was surrounded by circulating cooling oil, the two-bed system suffered from non-uniform temperature profile along the Claus bed, i.e., the top of the bed was hotter than the desired temperature and the bottom of the bed was cooler than the desired temperature. It was also observed that some liquid sulfur was soaking the back end of the Claus catalyst bed surface, and it was hypothesized that this might have inhibited further conversion in that study by a gradually decreasing sulfur yield as the catalyst zone became incrementally inactivated. To explore this hypothesis, in a repeat test the second (Claus) catalyst bed was carefully situated or staged so as to provide for the liquid sulfur to drain off the catalyst surface effectively to prevent soaking the catalyst surface with the liquid sulfur. The system was oriented vertically, as shown in FIG. 2, and the temperature control of the gas entering the second (Claus) catalyst bed and the temperature control of the Claus catalyst bed itself were improved. By assessing the heat load and heat transfer characteristics of the equipment, the optimum spacing between the first (partial oxidation) and second (Claus) catalyst beds was determined, and the heat transfer capability was improved by filling the space between the first and second catalyst beds with an inert heat transfer enhancement medium (HTEM) 24, quartz beads. The desired temperature of the Claus catalyst was maintained by enclosing the portion of the vessel containing the Claus catalytic reaction zone 30 in a heating/cooling jacket 32. These improvements led to a further increase in sulfur yield that did not decrease with time. With this optimized two catalyst bed reactor system, the sulfur yield increased to a steady state 88%. The results of this study are shown in Table 3.

In representative tests a cumulative sulfur yield of more than 89% and more than 95% $H_2S$ conversion was obtained after the first Claus bed, with a GHSV in the first catalyst bed (i.e., the partial oxidation reaction zone) more than 80,000 $h^{-1}$, and with a GHSV of more than 15,000 $h^{-1}$ in the second catalyst bed (i.e., the first Claus catalytic reaction zone). By contrast, similar or lesser yield and conversion values obtained in conventional Claus sulfur recovery units can only operate at a much lower GHSV, on the order of about 1,000-2,000 $h^{-1}$. Advantageously, high sulfur yield and high $H_2S$ conversion levels are now, for the first time, obtainable in vessels of smaller volume and at lower capital cost for sulfur recovery plant construction.

Example 4

Sulfur Recovery Process with Three Staged Catalyst Beds

The two-catalyst bed design employed in Example 3 was next modified to include an "elbow" or secondary vessel containing a second Claus catalyst bed downstream from the first Claus catalyst bed. This modification provides intermediate sulfur removal between the two Claus catalyst beds, using gravity, fluid dynamics and temperature control, and is schematically depicted in FIG. 3. The third Claus catalyst bed also comprised 1-mm gamma-alumina (Sasol) spheres. The 3 inch space between the first and second catalyst beds was not filled with HTEM, and the 10 inch space between the second and third catalyst beds was also not filled with HTEM. The test process was similar to that of Example 1. The test results are reported in Table 4, which shows the performance of the staged three-catalyst system as a function of time. It can be seen that the total S yield had increased to 90% early in the run when the third catalyst was not inactivated by temperature gradients and sulfur saturation. Preferably the spaces between the first and second Claus catalyst beds are filled with HTEM, to facilitate temperature control of the gases prior to contacting the Claus catalysts.

Example 5

Optimized Sulfur Recovery Process with Three Catalyst Beds

While the three-catalyst bed design of Example 4 provided for substantially sulfur-depleted gases (i.e., less than about 5% elemental sulfur) to flow to the third catalyst bed for reaction, that design was not entirely satisfactory. In the initial tests reported in Table 4, that system provided a small increase in sulfur yield compared to the system of Example 4; however, it was observed that the second Claus catalyst subsequently lost activity because of the gradual accumulation of liquid sulfur saturating the second Claus catalyst bed. Although the gas leaving the jacketed portion of the vessel (illustrated schematically in FIG. 3) was at its dewpoint or lower, it nevertheless contained some entrained liquid sulfur that was carried over into the second Claus catalyst bed.

Accordingly, further improvement of the "elbow" design was sought next. The initial three-catalyst bed design was modified as shown in FIG. 4, except that HTEM was not initially employed in zone 20*d* and 54. The sulfur recovery test process was carried out as described in the previous examples under the conditions noted in Table 5. The spacing between the first and second catalyst beds was 5 inches, and the spacing between the second and third catalyst beds was 10 inches. Gamma-alumina Claus catalyst beds are well known in the art. The length and size of the present Claus bed lengths are determined with standard engineering calculations applying the desired GHSV range and the known properties of gamma alumina. The bed size is preferably as small as possible, to minimize cost, yet long enough to handle feed flow rate fluctuations in practice. In the process carried out in this system, elemental sulfur was condensed from the process gases exiting the first Claus catalyst bed 30*d*, by flowing the gases through cooling zone 40*d* and further through the upwardly inclined section of metal tubing (channel 52*d*) maintained at a temperature below the dewpoint of sulfur. This caused further cooling of the gases, and allowed the condensed sulfur to drain back into the sulfur receiver and away from the second Claus catalyst bed. The rate of condensation is controlled by the flow rate of gases in this inclined section, the local temperature and the slope of the section, which controls the flow rate of elemental sulfur liquid in this section. The temperature of gases entering the third catalyst bed (i.e., second Claus catalyst bed) and that of the third bed itself are controlled by local heaters or other means. The new compact sulfur recover plant comprising three catalyst bed reactors (i.e., a partial oxidation catalyst bed followed by two Claus catalyst beds), provided tighter temperature control and improved sulfur condensation zones, which increased the steady state sulfur yield to 94% without any significant decrease in catalyst activity over time. With this optimized system the Claus catalyst beds are much smaller in volume than the conventional catalyst beds used in typical sulfur recovery units. In terms of gas hourly space velocity, the gases flowing through the catalyst beds of this optimized sulfur plant design operated 10-20 times faster than a conventional Claus unit. Even better performance will be obtained when HTEM is employed in the apparatus, as shown in FIG. 4. The use of HTEM is of the most benefit when large temperature gradients are needed, such as between the partial oxidation catalyst bed and first Claus catalyst bed or between the first and second Claus catalyst beds. Representative sulfur recovery tests employing this vertical reactor system design were operated successfully in fast reaction mode, i.e., GHSV in the first Claus catalyst bed in the range of 5,000-30,000 h$^{-1}$, and GHSV in the second Claus catalyst bed in the range of 3,000-20,000 h$^{-1}$. By contrast, a conventional modified Claus sulfur recovery unit is only capable of operating at GHSV up to about 1000 h$^{-1}$.

Process for Recovering Sulfur from an H$_2$S-containing Stream

The steps of a representative sulfur recovery process are summarized in the block flow diagram shown in FIG. 1, as may be carried out in the compact sulfur recovery plant (SRP) illustrated in FIG. 5, for instance. In operation, one process for recovering sulfur from an H$_2$S-containing gas stream generally includes the sequential steps of (a) carrying out the partial oxidation of H$_2$S in the presence of O$_2$ to produce a first process gas stream comprising gaseous elemental sulfur, SO$_2$ and unconverted H$_2$S; (b) adjusting the temperature of the first process gas stream to a temperature or temperature range ($T_1$) that favors the conversion of SO$_2$ and H$_2$S according to the Claus reaction, e.g., about 500° F. (260° C.); (c) carrying out the Claus reaction of SO$_2$ and unreacted H$_2$S in the first process gas stream over a first Claus catalyst to produce a second process gas stream comprising gaseous elemental sulfur, SO$_2$ and residual H$_2$S, wherein the Claus reaction is carried out at a catalyst temperature or temperature range ($T_1$) that favors the Claus reaction and keeps; and (d) deterring accumulation of liquid elemental sulfur on the first Claus catalyst, e.g., by vertically orienting the first Claus reactor. Preferably the process continues with the following sequential steps: (e) adjusting the temperature of the second process gas stream to a temperature or temperature range ($T_2$) that favors the condensation of sulfur from the second process gas stream; (f) separating the liquid elemental sulfur from the second process gas stream to form a third process gas stream; (g) adjusting the temperature of the third process gas stream to a temperature or temperature range ($T_3$) that favors the conversion of H$_2$S and SO$_2$ according to the Claus reaction, e.g., about 400° F. (204° C.); (h) carrying out the Claus reaction of SO$_2$ and residual H$_2$S in the third process gas stream over a second Claus catalyst to produce a fourth process gas stream comprising gaseous elemental sulfur and residual gas, wherein the second Claus reaction is carried out at a catalyst temperature or temperature range that favors the conversion of H$_2$S and SO$_2$ according to the Claus reaction, e.g., 400° F. (204° C.); and (i) deterring accumulation of liquid elemental sulfur on the second Claus catalyst. For example, the apparatus, or one or more component thereof, is oriented so that the force of gravity on liquid sulfur in the first and/or second Claus catalytic reaction zone(s) causes any liquid sulfur that is present to move away from the Claus reaction zones. The process further includes: (j) adjusting the temperature of the third process gas to a temperature or temperature range ($T_3$) that favors condensation of elemental sulfur from the fourth process gas stream, e.g., about 280° F. (138° C.); and (k) recovering condensed elemental sulfur. The process may, optionally, also include (l) subjecting the residual gas to tail gas treatment. Preferably the temperature or temperature ranges for the Claus catalyst beds $T_1$ and $T_2$ are sufficiently high to prevent elemental sulfur contained in or formed by the Claus reaction from condensing, but are kept low enough to promote the maximum level of conversion.

More specifically, a system of apparatus as schematically shown in any of FIGS. 1-5 is set up to receive a H$_2$S-containing gas stream that contains a level of H$_2$S which is too great to be safely released into the atmosphere and/or from which it is desirable to recover useful elemental sulfur. The initial H$_2$S-containing stream preferably contains at least 20% H$_2$S. In some situations, the feed gas contains 10-40% H$_2$S as found in many natural gas plant amine acid gases, or it may even be an acid gas stream containing 70-100% H$_2$S (by volume) A concentrated acid gas stream containing about 80-85% H$_2$S, as is commonplace in refineries today, is another example of an appropriate feed for this process. Optionally, a small amount of light hydrocarbon (i.e., $C_1$-$C_5$) may also be present in the feed, preferably no more than 5 vol. %, more preferably less than 1-2 vol. %. If the amount of hydrocarbon in the feed is greater than about 10%, an amine absorption/regeneration unit is preferably employed prior to introduction of the feed to the SCTR partial oxidation reactor. The balance of these H$_2$S-containing streams generally comprises CO$_2$ and water vapor.

Preheating and Mixing the Reactant Gases. The H$_2$S-containing gas stream and an O$_2$-containing stream, together referred to as the feed gases, are preferably preheated, prior to entering CPOX reaction zone 10 or 210. It is preferred to preheat the feed gases separately, preferably to about 450° F. (232° C.) to facilitate initiation of the direct partial oxidation reaction. Molecular oxygen is provided in the form of air, pure oxygen, or an air/oxygen mixture. The feed gases are introduced into reaction zone 10 or 210 as a mixture or fed separately and mixed in the reactor before contacting the catalyst. Mixing may be accomplished using a static mixer, such as a group of vanes projecting from the walls of a concentric perforated pipe (not shown), however, any suitable manner of mixing the gases may be employed without altering the principles or operation of the system. As shown in FIGS. 2, 3 and 4, mixing zone 8 is preferably equipped with a heater 6. A temperature measurement device, such as a thermocouple 7, is preferably employed to facilitate precise temperature control of the feed gas mixture. If the H$_2$S-containing gas and the O$_2$-containing gas are introduced separately, the feed injection openings can be configured in any of a number of different ways without affecting the principles or operation of the present system. Preferably the molar ratio of O$_2$ to H$_2$S is about 0.25:1 to about 0.75:1, more preferably at or near the stoichiometric ratio of 0.5:1. The gases are thoroughly mixed to keep deep oxidation reactions from taking place excessively or predominating in reaction zone 30 or 230 to form an excessive amount of SO$_2$. Advantageously, in the present process it is not necessary to eliminate or minimize the production of SO$_2$. However, it is preferred that the reacted gas mixture from reaction zone 30 or 230 comprise an amount of SO$_2$ not exceeding about 25 vol %, more preferably the ratio of H$_2$S to SO$_2$ in the effluent is in the range of 1.8:1 to 2.2:1, in order to facilitate the efficient operation of the subsequent Claus reaction, as further described in paragraphs that follow. The contact time between the oxygen and H$_2$S is preferably minimized prior to contact with the catalyst in order to prevent formation of a stagnant explosive mixture in reaction zone 10 or 210. Contact time between the O$_2$ and H$_2$S is minimized by placing inert filler material in any void spaces in the piping upstream of reaction zone 10 or 210.

Prior to contacting the partial oxidation catalyst in reaction zone 10 or 210, the reactant gas mixture is preferably shielded by a radiation barrier, such as a ceramic foam disk, from the heat that is generated by the chemical reactions occurring in CPOX reaction zone 10 or 210. The contact time of the feed gas stream with the first catalyst is preferably less than about 200 milliseconds. For example, it may be only 20-50 milliseconds, or even 10 milliseconds or less when operating the system at very high flow rates. When employing a catalyst monolith or packed bed of divided catalyst, the surface area, depth of the catalyst bed, and gas flow rate (space velocity) are preferably managed to ensure the desired short contact time (i.e., 200 milliseconds or less). It is well known that contact time is inversely proportional to the "space velocity," as that term is customarily used in chemical process descriptions, and is typically expressed as volumetric gas hourly space velocity (GHSV) in units of $h^{-1}$. Preferably the partial oxidation of $H_2S$ in the first reaction zone is carried out at a GHSV of at least 20,000 $h^{-1}$. The maximum GHSV will generally be determined by the specific equipment used; however, the theoretical limit is that velocity at which the reaction would be extinguished. If external means of heating the catalyst is used, this theoretical limit is quite large. For example, a preferred working range is 20,000-400,000 $h^{-1}$, more preferably a GHSV in the range of about 80,000-200,000 $h^{-1}$ is employed.

Partial Oxidation Stage. When the rapidly moving reactant gas mixture contacts the catalyst in zone 10 or 210, it becomes instantaneously heated sufficiently to initiate an oxidation reaction, the temperature quickly reaching the range of 1,200-2,700° F. (649-1,482° C.), preferably staying in the range of about 1,500-2,400° F. (816-1,315° C.), as the partial oxidation reaction proceeds and predominates in zone 10 or 210. In a typical process the upper temperature limit of the catalyst preferably stabilizes at about 2,200-2,400° F. (1,204-1,315° C.). It is preferred to begin by heating the catalyst by partially oxidizing a light hydrocarbon gas so that the preferred catalyst will be carbided before the introduction of $H_2S$. After the catalyst achieves the desired starting temperature, the oxygen containing stream and $H_2S$ containing stream are introduced to the preheated catalyst beginning the self sustaining partial oxidation reaction.

The catalyst operating temperature is a function of preheat temperature, fuel composition and flow rate, oxygen in the air or oxygen supplied, and the heat losses to the surroundings. These variables are preferably controlled to complete the partial oxidation reaction within the preferred dwell time of less than 200 milliseconds, not to exceed the limits of the refractory materials lining the reactor, for example, about 2,700-2,800° F. (1,482-1,538° C.) for 94% alumina, and to prevent extinguishing the reaction.

At this point in the process, about 80% of the $H_2S$ will have been converted, and the elemental sulfur yield is about 70 vol. %. As much as about 10% of the original $H_2S$ is in the form of $SO_2$ at the end of this stage, but preferably no more than about 15 vol. % $SO_2$.

First Temperature-Control Stage. Referring to FIG. 1, the reacted gases, comprising primarily elemental sulfur, un-reacted $H_2S$, $SO_2$ and $H_2O$, exit reaction zone 10 and enter first temperature-control zone 20. The radiation shield and support hold the catalyst bed in place and shield the reacted gases from the hot catalyst, so that the temperature of the reacted gases emerging from reaction zone 10 begins to decline rapidly as they enter the first temperature-control zone 20. In temperature-control zone 20 the reacted gases from the CPOX reaction zone 10 are cooled to a predetermined temperature or temperature range that is suitable, preferably optimal, for the first Claus catalyst to catalyze the Claus reaction in zone 30. The first temperature-control stage provides the benefit of better sulfur yield at lower Claus catalyst temperature without having to cool the reacted gases so much that sulfur is condensed prior to the first Claus catalytic stage.

As illustrated in FIGS. 2, 3 and 4, the first temperature control zone provides sufficient area with the available temperature difference between the process gases in the tube and the media outside the tube to cool the mixture to a temperature at the inlet of the first Claus catalyst bed to promote the maximum amount of Claus reaction without reaching the sulfur dew point in the catalyst bed. A temperature range of about 400-650° F. (204-343° C.) is preferred. Preferably a suitable heat transfer enhancement medium (HTEM), such as refractory ceramic beads, fills zone 20a/20c/20d, to facilitate rapid cooling and to facilitate a uniform predetermined temperature when the gases enter the first Claus reaction zone 30a/30c/30d.

When the process is carried out in the configuration shown in FIG. 5, for instance, in which the first temperature-control zone 220 employs a waste heat exchanger, such as a fire-tube waste heat boiler, with vertically oriented thermal tubes, the continuous circulation of a suitable liquid medium is begun in the shell side prior to start up of the process. The suitable liquid medium is a fluid that is capable of cooling the rapidly flowing gases, e.g., heat transfer oil, pressurized water, or boiling water by cooling tubes. When the hot gases contact tubes, heat is conducted away by the tubes, which are preferably metal, such as carbon steel, and is transferred to the liquid medium. Heat transfer enhancement medium (HTEM) is preferably packed in the tubes of the waste heat exchanger/first temperature-control zone 220. HTEM may also be packed in the tubes of the first sulfur condenser/second temperature-control zone 240, to further enhance the heat transfer rate. Boiling water is a preferred liquid medium in order to reduce the amount of fluid temperature variation. Advantageously, the evolved steam may be captured for secondary use. Since the boiling water remains at a relatively constant temperature, and since the tubes conduct heat readily, tubes normally attain temperatures only slightly above the temperature of boiling water. Preferably the initial portions of tubes nearest to partial oxidation zone, which may be exposed to temperatures of 1,300° C. or more, are protected by a heat resistant covering such as a ceramic ferrule. The rapid cooling that occurs in the waste heat exchanger drops the temperature of the reacted gases preferably to about 400-650° F. (about 204-343° C.), and more preferably about 550° F. (287° C.). The temperature ($T_1$) of the cooled gases (first process gas stream) is not so low, however, that sulfur vapor in the process gas stream is able to condense before or in the first Claus catalyst bed.

First Claus Catalytic Reaction Stage. Referring again to FIGS. 1 and 5, the reacted gas stream (first process gas stream), which comprises primarily elemental sulfur, $SO_2$, unreacted $H_2S$ and water vapor, exits first temperature-control zone 20 or 220 and flows into first Claus catalytic zone 30 or 230. At this point in the process, the elemental sulfur yield is preferably about 70%, no condensation and removal of elemental sulfur has been performed, and there is no reheating of the feed entering the first Claus reaction zone. In Claus zone 30 or 230 a portion of the $H_2S$ and $SO_2$ in the feed is converted to additional elemental sulfur and water, according to the Claus reaction (Equation 2). The GHSV of the gases flowing over the catalyst in zone 30 or 230 is preferably slowed to about 5,000 $h^{-1}$, to 30,000 $h^{-1}$, more preferably about 5,000 $h^{-1}$ to about 20,000 $h^{-1}$, in order to compensate for the slower reaction rate of the Claus reaction and to obtain a better yield of $S^0$ product.

Referring now to FIGS. 2, 3 and 4, the first Claus reaction zone 30a, 30c or 30d may be optionally enclosed by a heating/cooling jacket 32a or 32b for regulating the temperature of the Claus catalyst in reaction zone 30a, 30c or 30d at a desired temperature. Thus, the temperature of the first Claus catalyst may be monitored and heated or cooled, as needed, in order to keep the catalyst temperature more uniform over the length of the catalyst bed, to optimize the yield of sulfur produced in zone 30. Suitable thermostatically controlled heating, cooling and combination heating and cooling jackets are known in the field and are commercially available from well-known suppliers. Pressurized boiling water/steam is a preferred heat transfer medium for circulating in the jackets surrounding the Claus reaction zone. During operation of the system, the temperature of the circulating heat transfer medium and its flow rate are managed to obtain the desired catalyst temperature or temperature range. Preferably the Claus catalytic reaction is carried out at a temperature that promotes the maximum amount of Claus reaction but prevents sulfur from condensing in the catalyst bed. The vertical downward flow configuration, shown in FIGS. 2, 3 and 4, provide for any condensed sulfur to drain down from the catalyst and into sulfur separation zone 50a, 50c, or 50d. By operating the Claus reaction at a relatively low temperature ($T_2$), and at the same time removing condensed sulfur product, the process avoids the drawbacks of other Claus sulfur recovery processes in which the presence of a significant amount of gaseous sulfur product drives the Claus reaction (Equation 2) in the reverse direction, which in turn reduces the net yield of sulfur. Also, since condensed sulfur is at the same time prevented from pooling or accumulating on the catalyst, catalyst deactivation is deterred. From Claus reactor 30a, 30c or 30d, the reacted gas stream (second process gas stream), containing primarily unreacted $H_2S$, $SO_2$, elemental sulfur, and $H_2O$, then enters the second temperature-control zone 40a, 40c or 40d.

Second Temperature-Control Stage. With reference to FIGS. 1-5, in the second temperature-control zone 40, 40a, 40c, 40d or 240, respectively, the gases are cooled to the dewpoint of elemental sulfur ($T_2$), or below, sufficient to condense most of the sulfur vapor out of the reacted gas stream (second process gas stream). The condensed sulfur is removed from the vapor stream in a sulfur separation zone 50, 50a, 50c, 50d or 250 to sulfur outlet 51, 51a, 51c, 51d or 251, preferably assisted by the vertical orientation of the reaction vessel 3 (denoted in FIG. 2) and the force of gravity. Vapor-liquid separator 50, 50a, 50c, 50d or 250 is a vertical vessel into which liquid sulfur and vapor/gas mixture is fed, and wherein the liquid sulfur is separated by gravity, falls to the bottom of the vessel, and is withdrawn. The gas travels upward at a design velocity which reduces, or preferably minimizes, the entrainment of any liquid sulfur droplets in the vapor as it exits the top of the vessel. In the sulfur separation zone of reaction vessel 3, the walls of the vessel are cooled by coolant jacket 42a, 42c or 42d so that the temperature of the gases heated by the Claus reaction is reduced to a suitable temperature for condensing out as much of the elemental sulfur as possible or practical. In some versions of the process, especially if the level of desulfurization of the process gas is acceptable at this stage, the elemental sulfur is harvested and the residual gas is disposed of.

Referring to FIG. 2, the gaseous effluent is separated from the sulfur liquid in the outlet channel head 50a, or it can be separated in a vessel (not shown) below the heat exchanger 40a. The latter arrangement has the advantage of storing the liquid sulfur produced without the need for a barometric seal leg, SulTrap™, or steam jacketed piping normally needed to transport liquid sulfur from a typical sulfur condenser to a typical storage pit. If desired, an additional condensation step can be applied to the gases exiting temperature-control zone 40a (such as a sulfur condenser), after gas outlet 52a, to lower the amount of elemental sulfur vapor carried to an incinerator or tail gas treating unit (not shown).

Referring now to FIG. 5, HTEM may be packed in the tubes of first sulfur condenser/second temperature-control zone 240 to enhance the heat transfer rate.

Auxiliary Temperature-Control Stage. By using the arrangement of FIG. 3, if the second temperature control zone is operated such that the inlet temperature to the second Claus bed will cause the formation of liquid sulfur in the Claus bed, then an optional preheater 55 may be placed on channel 52c to allow controlling the inlet temperature to the Claus bed. If the apparatus is small enough, the heater 62c can provide the additional heat required to prevent the condensation of sulfur on the catalyst. By using the arrangement of FIG. 4, the performance can be further improved by adding the HTEM in channel 52d, but this arrangement will need the preheater 55 on structure 112d to prevent the condensation of sulfur in the second catalyst bed. For a smaller apparatus, the heater 62d can be placed before the catalyst bed, before and around the catalyst bed or only around the catalyst bed.

When a configuration like that illustrated schematically in FIG. 4 is employed, the sulfur content of the process gas stream exiting Claus zone 30d is further reduced. The reacted gases are cooled in a second temperature-control zone 40d and the gas temperature is further adjusted or regulated as it flows through the upwardly inclined channel 52d. By further cooling the gases, gaseous elemental sulfur carried over from the first Claus catalyst reaction condenses and drains down into a sulfur separation zone 50d, away from the second Claus catalyst bed in secondary structure 112d. Similarly, any entrained liquid sulfur carried over from the previous temperature-control (cooling) stage will tend to coalesce on the HTEM and drain into the sulfur collector. The rate of condensation in auxiliary temperature-control zone 54 is controlled by the length of the inclined channel 52d, the local temperature. The temperature of the second process gas stream ($T_3$) is preferably monitored at the top of Claus reaction zone 60d using a thermocouple 35 connected to a thermostatically-controlled heating/cooling device.

Second Claus Catalytic Reaction Stage. In some embodiments of the process, a compact apparatus like that of FIG. 1, 3, 4 or 5 is employed for treating the second process gas stream in a second Claus catalytic reaction. In the apparatus of FIG. 3 or 4, from channel 52c or 52d, the gas stream continues flowing downward through secondary structure 112c or 112d and contacts the second Claus catalyst in zone 60c or 60d. Referring to FIG. 5, the second Claus catalytic reaction zone 260 received the process gas from sulfur separation zone 250. The gas hourly space velocity (GHSV) in zone 60d is preferably about 3,000 $h^{-1}$ to about 20,000 $h^{-1}$, more preferably about 5,000 $h^{-1}$ to about 10,000 $h^{-1}$. In zone 60d or 260 residual $H_2S$ and the $SO_2$ in the gas stream are converted to elemental sulfur and water.

Preferably the second Claus catalyst is like the catalyst employed in the first Claus catalytic reaction stage. Preferably the entire reaction zone 60d or 260 is maintained at a temperature or narrow temperature range that maximizes the sulfur yield from the Claus reaction, the temperature being controlled by any suitable means known in the field, e.g., electrical, thermal or steam. For instance, a liquid heat exchange medium maintained at a suitable predetermined temperature is circulated in jacket 62 for transferring heat through the vessel wall next to the catalyst, as discussed above with respect to the first Claus catalyst.

Preferably the temperature of the catalyst in zone 60d or 260 is maintained in the range of about 400-600° F. (204-315° C.). As in the first Claus catalytic reaction zone 30d, preferably the second Claus catalytic reaction is also carried out at a temperature, or over a desirable temperature range, in which the Claus catalyst is active and which prevents sulfur from condensing in the catalyst bed, e.g., 450° F. (232° C.). The vertical downward flow configuration, shown in FIGS. 3-5, provides for any condensed sulfur to drain down from the catalyst to outlet 64, 102 or 302, or into a sulfur separator 90 or 290 (FIGS. 1 and 5).

Third Temperature-control Stage. Referring to FIGS. 1 and 4, in certain embodiments, the recovery of sulfur from the reacted gas (third process gas stream) exiting second Claus catalytic reaction zone 60 or 60d is enhanced by flowing the gas through channel 71 containing a third temperature-control zone 70, to additionally cool and control the temperature of the effluent from zone 60. By further cooling the gases to a temperature or temperature range of 255-300° F. (123-149° C.), elemental sulfur condenses, and, together with any entrained liquid sulfur carried over from zone 60 or 60d, drains into channel 71. The rate of sulfur condensation in the third temperature-control zone 70 is controlled mainly by the temperature of the entering gas, the lengths of zone 70 and channel 71, and the temperature ($T_3$) maintained by jacket 72. After leaving the third temperature-control zone 70, the condensed sulfur and effluent gases enter vapor-liquid sulfur separator 90, from which liquid elemental sulfur exits at sulfur outlet 102 and the tail gas exits via outlet 100. Preferably, the condensed sulfur from sulfur outlet 51 combines with the liquid sulfur from outlet 102 via sulfur conduit 80.

Tail Gas Treatment. The residual or tail gas may be incinerated and discharged to the atmosphere via a vent stack, if applicable standards permit, or may be fed to a downstream tail gas treater. Any available tail gas treating technique may be employed to further purify the tail gas. For example, a hydrogenation/hydrolysis catalyst may be employed, or a conventional Claus tail gas treatment process such as Beavon Sulfur Removal™ (BSR™) or Shell Claus Offgas Treating™ (SCOT™), in which sulfur vapor and $SO_2$ are hydrogenated to $H_2S$ and COS and $CS_2$ are hydrolyzed to $H_2S$ and $CO_2$, and the $H_2S$ is removed by an amine absorption/regeneration system and recycled to the $H_2S$ containing feed gas.

The demand for new sulfur plants is expected to continue for many years as crude oil and natural gas deposits that contain higher levels of sulfur and $H_2S$ are exploited. A typical 100 long ton per day (LTPD) Claus plant costs millions of dollars. Reducing the number of pieces of equipment, as described herein, removing the customary pit and steam jacketed piping, eliminating the burner management system of a typical free flame combustion system is expected to reduce the cost of a sulfur recovery unit significantly. Moreover, orienting the stages of the process in a vertical position saves a considerable amount of plot space compared to a conventional Claus assembly. Both the cost and plot space savings, combined with the simplicity of operation and lower maintenance costs, make the disclosed system and process very attractive to plant operators considering new sulfur plant technology.

By implementing the disclosed sulfur recovery process and thereby reducing the amount of equipment necessary to obtain a high level of sulfur recovery from an $H_2S$ containing feed gas, the total pressure drop through the sulfur plant can be greatly reduced. Control of $H_2S$, oxygen and reductant gas feeds is maintained using standard sulfur plant equipment, such as air demand analyzers, feed back control and the like. Since Claus plants are normally limited by the amount of pressure drop due to the low pressure operation, the present system advantageously allows for capacity expansion by retrofit of existing Claus plants. Other improvements over existing technologies for sulfur removal will also be apparent from the present disclosure.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. Use of the term "optionally" with respect to any element of a claim is intended to mean that the subject element is required, or alternatively, is not required. Both alternatives are intended to be within the scope of the claim. The disclosures of all patents, patent applications and publications cited herein are hereby incorporated herein by reference, to the extent that they provide exemplary, procedural or other details supplementary to those set forth herein.

TABLE 1

Partial Oxidation (CPOX) Catalyst Only

| $H_2S$ Flowrate (sccm) | Air/ $H_2S$ ratio | Total flowrate (sccm) | CPOX Catalyst Bed GHSV ($h^{-1}$) | CPOX Catalyst Bed Residence Time (msec) | $H_2S$ Conv. (%) | S Yield (%) | $SO_2$ Yield (%) |
|---|---|---|---|---|---|---|---|
| 750 | 2.25 | 2437.5 | 121,208 | 29.7 | 80.49 | 72.06 | 8.43 |
| 850 | 2.25 | 2762.5 | 137,369 | 26.2 | 81.24 | 72.86 | 8.38 |
| 950 | 2.25 | 3087.5 | 153,530 | 23.5 | 81.76 | 73.32 | 8.44 |
| 1050 | 2.25 | 3412.5 | 169,691 | 21.2 | 82.58 | 74.14 | 8.44 |
| 1150 | 2.25 | 3737.5 | 185,852 | 19.4 | 82.74 | 74.00 | 8.74 |
| 1250 | 2.25 | 4062.5 | 202,013 | 17.8 | 83.52 | 74.89 | 8.62 |

TABLE 2

CPOX Catalyst and One Claus Catalyst without HTEM

| $H_2S$ Flowrate (sccm) | Air/$H_2S$ ratio | Total flowrate (sccm) | CPOX Catalyst Bed GHSV ($h^{-1}$) | CPOX Catalyst Bed Residence Time (msec) | Claus Catalyst Bed GHSV ($h^{-1}$) | Claus Catalyst Bed Residence Time (msec) | $H_2S$ Conv. (%) | S Yield (%) | $SO_2$ Yield (%) |
|---|---|---|---|---|---|---|---|---|---|
| 750 | 2.25 | 2437.5 | 121,208 | 30 | 15,151 | 237 | 88.35 | 83.91 | 5.44 |
| 850 | 2.25 | 2762.5 | 137,369 | 26 | 17,171 | 210 | 88.30 | 82.52 | 5.78 |
| 950 | 2.25 | 3087.5 | 153,530 | 24 | 19,191 | 188 | 88.50 | 82.73 | 5.76 |

TABLE 2-continued

CPOX Catalyst and One Claus Catalyst without HTEM

| H$_2$S Flowrate (sccm) | Air/H$_2$S ratio | Total flowrate (sccm) | CPOX Catalyst Bed GHSV (h$^{-1}$) | CPOX Catalyst Bed Residence Time (msec) | Claus Catalyst Bed GHSV (h$^{-1}$) | Claus Catalyst Bed Residence Time (msec) | H$_2$S Conv. (%) | S Yield (%) | SO$_2$ Yield (%) |
|---|---|---|---|---|---|---|---|---|---|
| 1050 | 2.25 | 3412.5 | 169,691 | 21 | 21,211 | 170 | 88.95 | 83.14 | 5.81 |
| 1150 | 2.25 | 3737.5 | 185,852 | 19 | 23,231 | 156 | 88.20 | 83.43 | 5.77 |
| 1250 | 2.25 | 4062.5 | 202,013 | 18 | 25,251 | 142 | 89.72 | 83.42 | 6.31 |

TABLE 3

CPOX Catalyst and One Claus Catalyst with HTEM

| H$_2$S flowrate (sccm) | Air/H$_2$S ratio | First (CPOX) Catalyst Bed Length (inches) | Second (Claus) Catalyst Bed Length (inches) | H$_2$S Conversion (%) | S Yield (%) | SO$_2$ Yield (%) |
|---|---|---|---|---|---|---|
| 1050 | 2.1 | 0.75 | 3 | 87.28 | 84.27 | 3.01 |
| 950 | 2.1 | 0.75 | 3 | 88.13 | 85.70 | 2.43 |
| 850 | 2.1 | 0.75 | 3 | 88.64 | 86.56 | 2.08 |
| 750 | 2.1 | 0.75 | 3 | 89.01 | 87.10 | 1.91 |
| 650 | 2.1 | 0.75 | 3 | 89.28 | 87.42 | 1.86 |
| 550 | 2.1 | 0.75 | 3 | 89.55 | 87.51 | 2.04 |
| 450 | 2.1 | 0.75 | 3 | 89.51 | 87.12 | 2.39 |

TABLE 4

CPOX Catalyst and Two Claus Catalysts with no intermediate sulfur removal

| H$_2$S flowrate (sccm) | Air/H$_2$S ratio | First (CPOX) Catalyst Bed Length (inches) | Second (Claus) Catalyst Bed Length (inches) | Third (Claus) Catalyst Bed Length (inches) | H$_2$S Conversion (%) | S Yield (%) | SO$_2$ Yield (%) |
|---|---|---|---|---|---|---|---|
| 750 | 2.25 | 0.75 | 2 | 2 | 97.09 | 90.01 | 7.08 |
| 750 | 2.25 | 0.75 | 2 | 2 | 91.23 | 81.57 | 9.66 |

TABLE 5

Optimized Process with CPOX Catalyst and Two Claus Catalysts with intermediate sulfur removal

| H$_2$S flowrate (sccm) | Air/H$_2$S ratio | First (CPOX) Catalyst Bed Length (inches) | Second (Claus) Catalyst Bed Length (inches) | Third (Claus) Catalyst Bed Length (inches) | H$_2$S Conversion (%) | S Yield (%) | SO$_2$ Yield (%) |
|---|---|---|---|---|---|---|---|
| 1250 | 2.4 | 0.75 | 3 | 4 | 95.37 | 91.26 | 4.11 |
| 1150 | 2.4 | 0.75 | 3 | 4 | 95.29 | 91.52 | 3.77 |
| 1050 | 2.4 | 0.75 | 3 | 4 | 95.23 | 91.66 | 3.56 |
| 950 | 2.4 | 0.75 | 3 | 4 | 95.16 | 91/87 | 3.29 |
| 850 | 2.4 | 0.75 | 3 | 4 | 95.08 | 92.05 | 3.02 |
| 750 | 2.4 | 0.75 | 3 | 4 | 94.79 | 92.17 | 2.62 |
| 650 | 2.4 | 0.75 | 3 | 4 | 95.20 | 92.68 | 2.53 |
| 550 | 2.4 | 0.75 | 3 | 4 | 95.70 | 93.04 | 2.66 |
| 450 | 2.4 | 0.75 | 3 | 4 | 96.12 | 93.34 | 2.79 |

What is claimed is:

1. A compact sulfur recovery system comprising a plurality of components in a generally upward serial fluid flow arrangement, said plurality of components comprising:
    a catalytic partial oxidation reaction zone capable of withstanding temperatures up to about 2,700° F. (1,482° C.);
    a first temperature-control zone;
    a first Claus catalytic reaction zone;
    a second temperature-control zone;
    a first vapor-liquid sulfur separation zone;
    a first liquid sulfur outlet;
    and a first effluent gas outlet, said system configured to deter the accumulation of liquid sulfur in said first Claus catalytic reaction zone,
    wherein said catalytic partial oxidation reaction zone, said first temperature-control zone, said first Claus catalytic reaction zone, said second temperature-control zone, and said first vapor-liquid sulfur separation zone are contained in a primary structure and arranged substantially vertically in the sequence given from below to above.

2. The system of claim 1, wherein said first temperature-control zone contains a heat transfer enhancement medium.

3. The system of claim 1, wherein said catalytic partial oxidation reaction zone, first temperature-control zone, first Claus catalytic reaction zone, second temperature-control zone, first vapor-liquid sulfur separation zone, and first liquid sulfur outlet are in a vertically oriented stacked arrangement.

4. The system of claim 3, further comprising a second Claus catalyst reaction zone and third temperature control zone in serial flow arrangement between the first vapor-liquid sulfur separation zone and the first effluent gas outlet.

5. The system of claim 1, wherein said vapor-liquid separation zone is configured to deter re-entrainment of liquid sulfur in a gas stream exiting said separation zone.

6. The system of claim 1, wherein said vapor-liquid separation zone is configured for promoting liquid drainage along a separate path than that of gas flowing to said gas outlet.

7. The system of claim 1, wherein the vapor-liquid separation zone is configured to deter liquid sulfur accumulation in said separation zone.

8. The system of claim 1, wherein said system comprises a primary structure containing said catalytic partial oxidation reaction zone, first temperature-control zone, first Claus catalytic reaction zone, second temperature-control zone, first vapor-liquid sulfur separation zone, first liquid sulfur outlet and first effluent gas outlet, in the absence of a sulfur condenser between said catalytic partial oxidation reaction zone and said first Claus catalytic reaction zone.

9. The system of claim 8, wherein said system further comprises a secondary structure in fluid flow communication with said first effluent gas outlet, said secondary structure comprising:
    a second Claus catalytic reaction zone adapted for receiving gas from said first vapor-liquid sulfur separation zone gas outlet,
    a third temperature-control zone,
    a second vapor-liquid sulfur separation zone,
    a second liquid sulfur outlet, and
    a second effluent gas outlet.

10. The system of claim 9 further comprising a preheater disposed between said primary and secondary structures and adapted for heating gases after leaving the first vapor-liquid separation zone and prior to entering the second Claus catalytic reaction zone.

11. The system of claim 9 wherein at least one of said components is oriented such that accumulation of liquid sulfur in said first and/or second Claus catalytic reaction zone(s) is deterred when said system is operated to recover elemental sulfur from a $H_2S$-containing gas stream.

12. The system of claim 11 wherein said primary and secondary structures are oriented such that the force of gravity on liquid sulfur in said first and/or second Claus catalytic reaction zone(s) causes said liquid sulfur to move away from said Claus reaction zones, when said system is operated to recover elemental sulfur from a $H_2S$-containing gas stream.

13. The system of claim 11 comprising a first channel interconnecting said primary and secondary structures, said first channel being oriented at an upward angle greater than about 5 degrees and less than about 90 degrees with the horizontal plane relative to the plane of the primary structure.

14. The system of claim 13 wherein said first channel comprises an auxiliary temperature-control zone containing a heat transfer enhancement material to cool and condense elemental sulfur from the vapor phase, and allow the liquid sulfur to drain.

15. The system of claim 1 further comprising a mixing zone preceding said catalytic partial oxidation reaction zone.

16. The system of claim 1 further comprising at least one temperature measuring device.

17. A system for recovering elemental sulfur from an $H_2S$-containing gas stream comprising:
    (a) means for carrying out the catalytic partial oxidation of $H_2S$ in the presence of $O_2$ to produce a first process gas stream comprising gaseous elemental sulfur, $SO_2$ and unconverted $H_2S$;
    (b) means for adjusting the temperature of said first process gas stream to a temperature or temperature range that favors the conversion of $H_2S$ and $SO_2$ according to the Claus reaction, wherein said first gas stream enters at a lower portion of said means for adjusting the temperature of said first process gas stream such that a heat transfer enhancement medium is arranged to be in at least nearly continuous contact with structural elements at the lower portion of said means for adjusting the temperature of said first process gas stream;
    (c) means for carrying out the Claus reaction of $H_2S$ and $SO_2$ in said first process gas stream to produce a second process gas stream, said means comprising a first Claus catalyst bed;
    (d) means for deterring accumulation of liquid elemental sulfur on said first Claus catalyst bed;
    (e) means for adjusting the temperature of said second process gas stream to a temperature or temperature range that favors the condensation of elemental sulfur from said second process gas stream but deters or prevents condensation in a second Claus catalyst bed;
    (f) means for separating elemental sulfur from the second process gas stream to make a third process gas stream;
    (g) means for carrying out the Claus reaction of $H_2S$ and $SO_2$ in said third process gas stream to produce a fourth process gas stream, said means comprising said second Claus catalyst bed;
    (h) means for deterring accumulation of condensed elemental sulfur on said second Claus catalyst bed; and
    (i) means for separating liquid elemental sulfur from the fourth process gas stream,
    wherein means (b), (c) and (d) exclude a sulfur condenser.

18. The system of claim 17, further comprising, after step (f) and before step (g):
    ($f_1$) means for reheating the third process gas stream to provide a reheated third process gas stream;
    ($f_2$) means for adjusting the temperature of said reheated third process gas stream to a temperature or temperature range that favors the conversion of $H_2S$ and $SO_2$ according to the Claus reaction, to provide a temperature-adjusted third process gas stream;
wherein, in step (g), said third process gas stream is the temperature-adjusted third process gas stream from step ($f_2$).

19. A process for recovering elemental sulfur from an $H_2S$-containing stream comprising:
(a) carrying out the partial oxidation of $H_2S$ in the presence of $O_2$ to produce a first process gas stream comprising gaseous elemental sulfur, $SO_2$ and unconverted $H_2S$;
(b) adjusting the temperature of said first process gas stream to a temperature or temperature range between 400 and 650° F. (204-343° C.) that favors the conversion of $SO_2$ and $H_2S$ to elemental sulfur according to the Claus reaction wherein the step of adjusting the temperature includes directing the first process gas stream to a lower portion of a waste heat boiler where a heat transfer enhancement medium is arranged to be in at least nearly continuous contact with structural elements of a lower portion of the waste heat boiler to maintain the waste heat boiler at the lower portion within a preferred temperature range while adjusting the temperature of the first process gas stream;
(c) passing said temperature-adjusted first process gas stream over a first Claus catalyst without prior removal of elemental sulfur in a sulfur condenser to carry out the Claus reaction of $SO_2$ and unreacted $H_2S$ to elemental sulfur, thereby producing a second process gas stream comprising gaseous elemental sulfur, $SO_2$ and residual $H_2S$, wherein said Claus reaction is carried out at a catalyst temperature or temperature range between 400 and 650° F. (204-343° C.) that favors the Claus reaction;
(d) deterring accumulation of liquid elemental sulfur on said first Claus catalyst;
(e) adjusting the temperature of said second process gas stream to a temperature or temperature range between 300 and 450° F. (149-232° C.) that favors the condensation of elemental sulfur;
(f) carrying out the separation of elemental sulfur from the vapor mixture in a vapor-liquid separation zone to produce a third process gas stream;
(g) adjusting the temperature of said third process gas stream to a temperature or temperature range between 400 and 600° F. (204-315° C.) that favors the conversion of $H_2S$ and $SO_2$ according to the Claus reaction;
(h) carrying out the Claus reaction of $SO_2$ and residual $H_2S$ in said third process gas stream over a second Claus catalyst to produce a fourth process gas stream comprising gaseous elemental sulfur and residual gas, wherein said Claus reaction is carried out at a catalyst temperature or temperature range between 400 and 600° F. (204-315° C.) that favors the conversion of $H_2S$ and $SO_2$ according to the Claus reaction;
(i) deterring accumulation of liquid elemental sulfur on said second Claus catalyst;
(j) adjusting the temperature of said fourth process gas stream to a temperature or temperature range between 250 and 350° F. (121-177° C.) that favors condensation of elemental sulfur from said fourth process gas stream, to provide a temperature-adjusted fourth process gas stream;
(k) recovering condensed elemental sulfur from said temperature-adjusted fourth process gas stream; and
(l) optionally, subjecting said residual gas to tail gas treatment.

20. A process for recovering elemental sulfur from a $H_2S$-containing gas stream comprising:
(a) obtaining the system of claim 1 wherein at least one said component is configured to deter accumulation of liquid sulfur in said first Claus catalytic reaction zone without removal of elemental sulfur in a sulfur condenser prior to carrying out a first Claus catalytic reaction in said first Claus catalytic reaction zone;
(b) introducing a feed gas stream comprising $H_2S$ and $O_2$ into said catalytic partial oxidation reaction zone such that a first process gas stream comprising elemental sulfur, unreacted $H_2S$, $SO_2$ and water is produced;
(c) in said first temperature-control zone, adjusting the temperature of said first process gas stream to a first predetermined temperature or temperature range that is no more than 650° F. (343° C.) and above the dewpoint of elemental sulfur prior to entry of said first process gas stream into said first Claus catalytic reaction zone wherein the step of adjusting the temperature of the first process gas stream includes directing the first process gas stream to a lower portion of a waste heat boiler where a heat transfer enhancement medium is arranged to be in at least nearly continuous contact with structural elements of a lower portion of the waste heat boiler to maintain the waste heat boiler at the lower portion within a preferred temperature range while adjusting the temperature of the first process gas stream;
(d) in said first Claus catalytic reaction zone, producing a second process gas stream, at a second predetermined temperature or temperature range, comprising an increased amount of elemental sulfur and a decreased amount of unreacted $H_2S$ relative to the amounts of elemental sulfur and $H_2S$ in said first process gas stream;
(e) in said second temperature-control zone, adjusting the temperature of said second process gas stream such that elemental sulfur condenses from said second process gas stream at a third predetermined temperature or temperature range; and
(f) recovering liquid sulfur from said first liquid sulfur outlet.

21. The process of claim 20 wherein, in step (c), the first predetermined temperature or temperature range is in the range of about 400-650° F. (204-343° C.).

22. The process of claim 20 wherein step (d) comprises adjusting the temperature of said first Claus catalytic reaction zone to a temperature or temperature range in the range of about 500-600° F. (260-315° C.).

23. The process of claim 20 wherein said system further comprises a second Claus catalytic reaction zone in serial flow arrangement between the first vapor-liquid sulfur separation zone and the first effluent gas outlet, said process further comprising:
(g) in said second Claus catalytic reaction zone, producing a third process gas stream comprising an increased amount of elemental sulfur and a decreased amount of unreacted $H_2S$ relative to the amounts of elemental sulfur and $H_2S$ in said second process gas stream;
(h) in said third temperature-control zone, adjusting the temperature of said fourth process gas stream to a predetermined temperature or temperature range in the range of 255-300° F. (124-149° C.), such that elemental sulfur condenses from said fourth process gas stream to yield an effluent gas stream and liquid sulfur;
(i) recovering liquid sulfur from said second liquid sulfur outlet; and
(j) optionally, subjecting said effluent gas stream to tail gas treatment.

24. The process of claim 23, wherein the system comprises:
a primary structure containing said catalytic partial oxidation reaction zone, first temperature-control zone, first Claus catalytic reaction zone, second temperature-control zone, first vapor-liquid sulfur separation zone, first liquid sulfur outlet and first effluent gas outlet, and
a secondary structure in fluid flow communication with said first effluent gas outlet, said secondary structure comprising a second Claus catalytic reaction zone comprising a gas temperature-regulation device upstream of the catalytic reaction zone, a third temperature-control zone, a second vapor-liquid sulfur separation zone, a second liquid sulfur outlet, and a second effluent gas outlet.

25. The process of claim 24, wherein step (g) comprises further adjusting the temperature of said second process gas stream to said third predetermined temperature or temperature range in the range of 400-500° F. (204-260° C.) before said second process gas stream enters said second Claus reaction zone.

26. The process of claim 20, wherein step (b) comprises maintaining a gas hourly space velocity of said feed gas stream in said catalytic partial oxidation reaction zone of at least 20,000 $h^{-1}$,; and step (d) comprises maintaining a gas hourly space velocity of said first process gas stream in said first Claus reaction zone of at least 5,000 $h^{-1}$.

27. The process of claim 23, wherein step (g) comprises maintaining a gas hourly space velocity of said second process gas stream in said second Claus reaction zone of at least 3,000 $h^{-1}$.

28. The process of claim 20 comprising maintaining a temperature or temperature range in the range of about 1,200-2,700° F. (649-1,482° C.) in said catalytic partial oxidation zone.

29. The process of claim 23, wherein in step (h), said predetermined temperature or temperature range is in the range of 270-290° F. (132-143° C.).

* * * * *